United States Patent [19]

Karger et al.

[11] Patent Number: 4,787,031

[45] Date of Patent: Nov. 22, 1988

[54] COMPUTER WITH VIRTUAL MACHINE MODE AND MULTIPLE PROTECTION RINGS

[75] Inventors: Paul A. Karger, Acton; Timothy E. Leonard, Groton, both of Mass.; Andrew H. Mason, Nashua, N.H.

[73] Assignee: Digital Equipment Corporation, Maynard, Mass.

[21] Appl. No.: 688,702

[22] Filed: Jan. 4, 1985

[51] Int. Cl.[4] ........................ G06F 12/14; G06F 9/44
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,858,182 | 12/1974 | Delagi et al. | 364/200 |
| 4,078,254 | 3/1978 | Beausoleil et al. | 364/900 |
| 4,084,231 | 4/1978 | Capozzi et al. | 364/200 |
| 4,177,510 | 12/1979 | Appell et al. | 364/200 |
| 4,253,145 | 2/1981 | Goldberg | 364/200 |
| 4,351,024 | 9/1982 | Bradley et al. | 364/200 |
| 4,430,705 | 2/1984 | Cannavino et al. | 364/200 |
| 4,500,952 | 2/1985 | Heller et al. | 364/200 |
| 4,507,752 | 3/1985 | McKenna et al. | 364/900 |
| 4,555,771 | 11/1985 | Hayashi | 364/900 |

OTHER PUBLICATIONS

Goldberg, R. P., "Architectural Principles for Virtual Computer Systems", Ph.D. Thesis, Harvard University, Cambridge, Mass., ESD-TR-105, Feb., 1973.
Madnick et al., "Operating Systems", McGraw-Hill, 1974, pp. 549-563.
Deitel, "An Introduction to Operating Systems", Addison-Wesley Pub. Co., 1984, pp. 601-629.

Primary Examiner—Gareth D. Shaw
Assistant Examiner—Jonathan C. Fairbanks
Attorney, Agent, or Firm—Cesari and McKenna

[57] ABSTRACT

A computer system including a processor and memory, the processor having a virtual mode of operation in which it uses a virtual machine monitor which allows it to service a plurality of users contemporaneously in a multiplexed manner, and a non-virtual, or real, mode of operation. The computer system has a set of at least three operation mode protection rings representing a hierarchy of access privilege levels in both the real and virtual modes, with the number of privilege levels in both the real and virtual modes being the same. The privilege levels govern the accessibility of memory locations to programs and the executability of certain privileged instructions, which cause control to be transferred to the virtual machine monitor when the processor is in a virtual mode. The two most privileged levels in the virtual mode are both treated as corresponding to the second most privileged level in the real mode, whereby if the processor is in the most privileged virtual operating mode, access to memory locations is permitted only if the location is accessible to the second most privileged mode. When an instruction is retrieved, the processor first performs a probe operation to determine whether it can access any required memory locations in response to its current privilege level, and then determines whether it is in a privilege level which allows it to process the instruction.

19 Claims, 25 Drawing Sheets

REAL/VIRTUAL REGISTER SET

| R 0 |
|---|
| R 1 |
| R 2 |
| ⋮ |
| R 13 |
| R 14 (STACK PTR) |
| R 15 (PRG CTR) |
| USER STACK PTR — 50 |
| SUPER STACK PTR — 51 |
| EXEC STACK PTR — 52 |

FIG. 3A

OPERATING MODES

| NUMBER | MODE |
|---|---|
| 0 | KERNEL |
| 1 | EXECUTIVE |
| 2 | SUPERVISOR |
| 3 | USER |

INCREASING PRIVILEGE ↑

FIG. 2B

REAL REGISTER

| KERNEL STACK PTR | — 53 |
|---|---|
| AST LVL | — 54 |
| INT STACK PTR | — 55 |
| INT SUM REG | — 56 |
| INT REQ REG | — 57 |
| PROC STATUS LW | — 60 |

FIG. 3B

VIRTUAL REGISTERS

| KERNEL STACK PTR | — 61 |
|---|---|
| AST LVL | — 62 |
| INT STACK PTR | — 63 |
| INT SUM REG | — 64 |
| INT REQ REG | — 65 |
| PROC STATUS LW | — 66 |

FIG. 3C

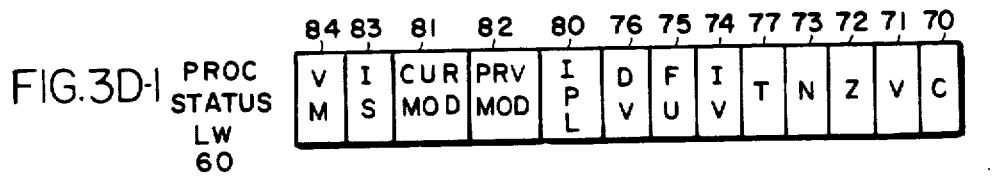

FIG. 3D-1 PROC STATUS LW 60

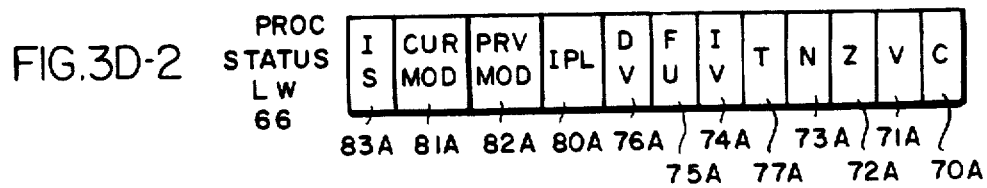

FIG. 3D-2 PROC STATUS LW 66

FIG. 7A-1

RETURN FROM EXCEPTION OR INTERRUPT

RETRIEVE PC AND PSL FROM STACK

COPY CONTENTS OF CURRENT PSL IN A TEMPORARY REGISTER

TEST CURRENT PSL (VM) TO DETERMINE IF SET     YES →  FIG. 7A-3

| NO

TEST RETRIEVED PSL (VM) TO DETERMINE IF SET     YES →  FIG. 7A-2

| NO

TEST RETRIEVED PSL TO DETERMINE IF VALID (FIG. 8B)     NO → ERROR

| YES

VERIFY THAT TRANSITION FROM CURRENT PSL TO RETRIEVED PSL IS VALID (FIG. 8C)     NO → ERROR

SAVE STACK POINTER REGISTER (FIG. 8E)

LOAD RETRIEVED PSL INTO REAL PSL REGISTER 60

FIG. 7A-5

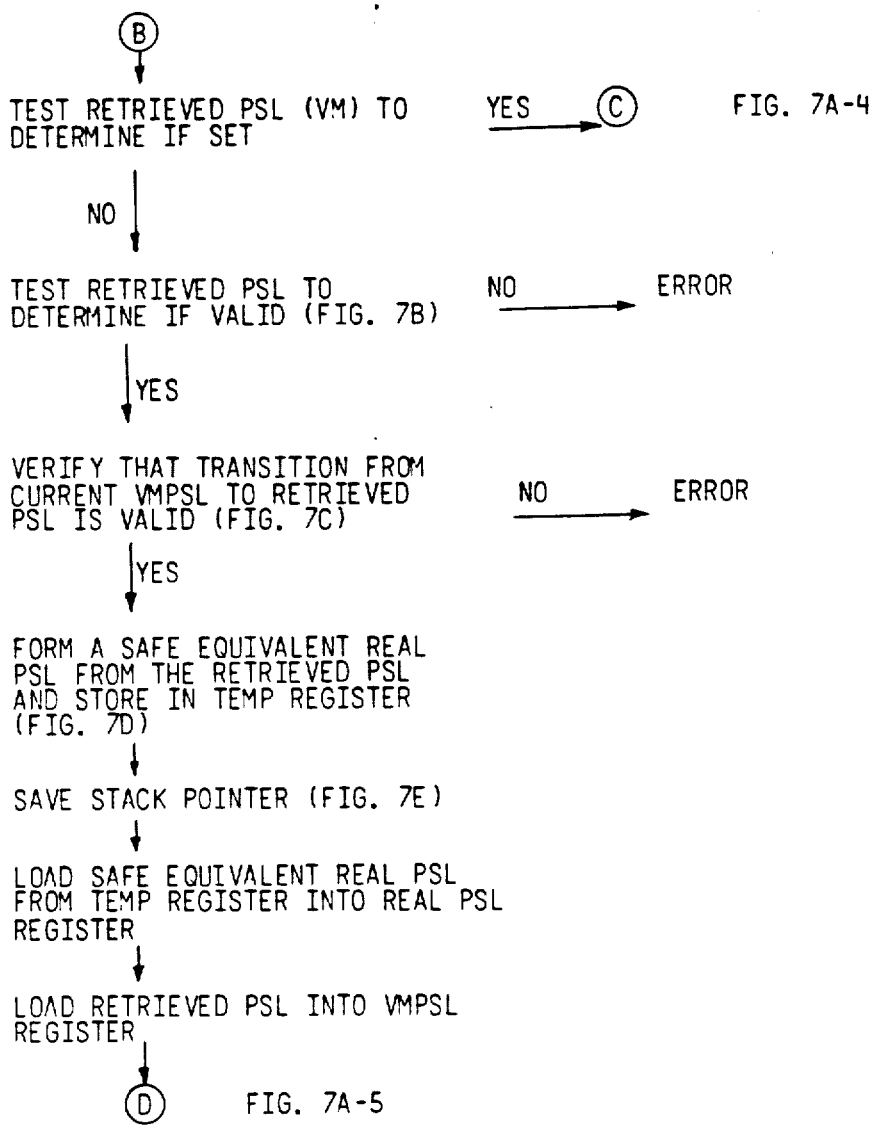

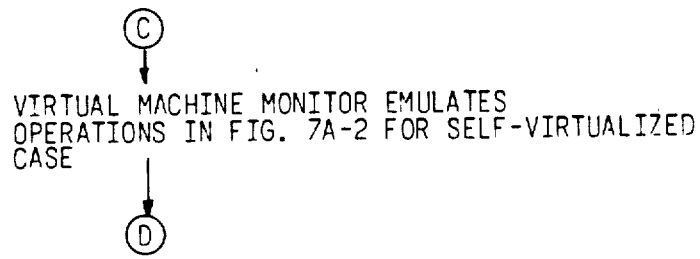

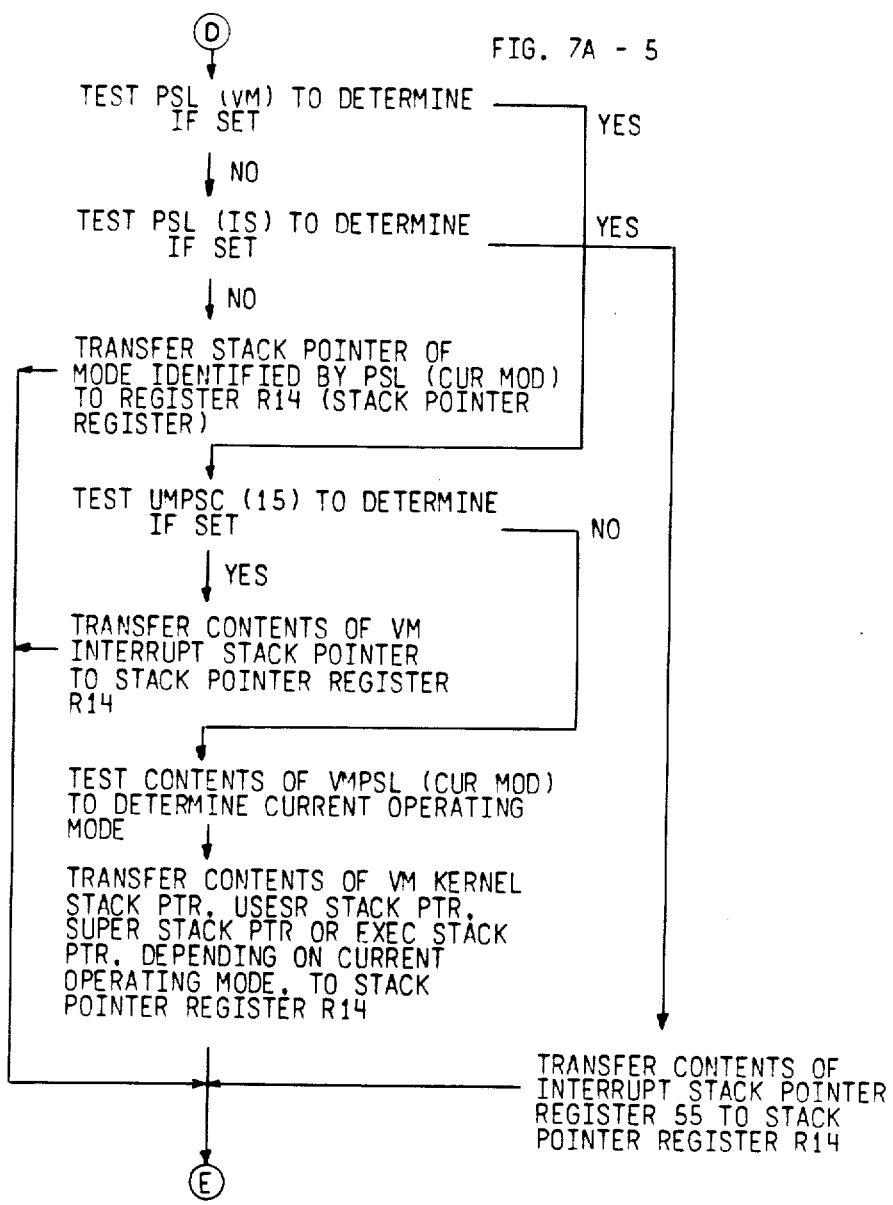

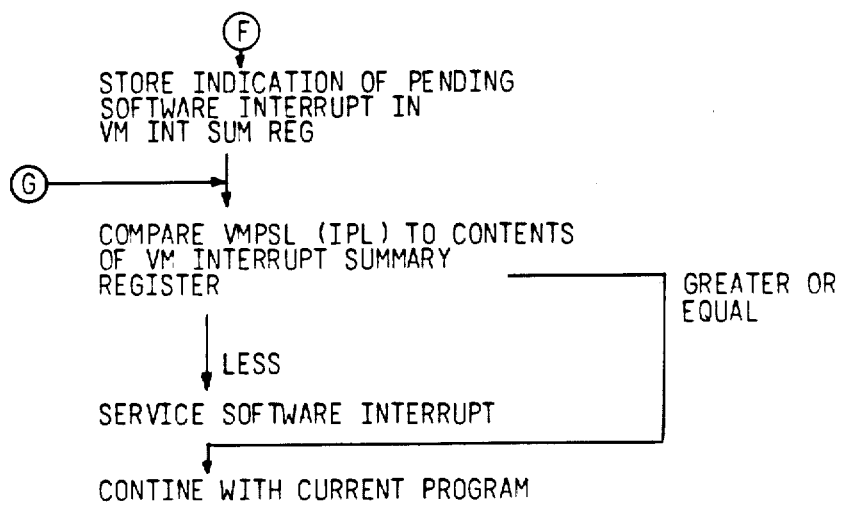

FIG. 7D

"SAFE EQUIVALENT" NEW PSL FORMATION

TRANSFER CONTENTS OF RETRIEVED PSL FIELDS
(DV), (FU), (IV), (T), (N), (Z), (V) AND (C) TO
CORRESPONDING LOCATIONS IN A TEMPORARY REGISTER

↓

PERFORM COMPRESSION OPERATION ON RETRIEVED
PSL (CUR MODE) FIELD. IF RETRIEVED PSL
(CUR MOD) FIELD IDENTIFIES KERNEL MODE,
STORE CODE IDENTIFYING EXECUTIVE MODE IN
CORRESPONDING LOCATION IN TEMPORARY REGISTER.
IF RETRIEVED PSL (CUR MOD) FIELD IDENTIFIES
ANY OTHER MODE, STORE CODE IDENTIFYING
THAT MODE IN SAME LOCATION

↓

REPEAT COMPRESSION OPERATION ON RETRIEVED
PSL (PRV MOD) FIELD, STORING CODE IN LOCATION
IN TEMPORARY REGISTER CORRESPONDING TO
PSL (PRV MOD) FIELD

↓

LOAD A "ONE" IN THE LOCATION
IN THE TEMPORARY REGISTER
CORRESPONDING TO THE PSL (VM)
LOCATION.

FIG. 7E

SAVE THE CURRENT STACK POINTER

TEST PSL (VM) TO DETERMINE IF SET — YES →

NO ↓

TEST PSL (IS) TO DETERMINE IF SET — NO →

YES ↓

TRANSFER CONTENTS OF STACK POINTER
REGISTER R14 TO INT STACK POINTER
REGISTER

TEST PSL (CUR MOD) TO DETERMINE
CURRENT OPERATING MODE

TRANSFER CONTENTS OF STACK PTR
REGISTER R14 TO USER STACK PTR,
SUPER STACK PTR, EXEC STACKPTR
OR KERNEL STACK PTR REGISTER
DEPENDING ON CURRENT OPERATION MODE

TEST UMPSL (IS) TO DETERMINE IF SET — NO →

YES ↓

TRANSFER CONTENTS OF STACK PTR REGISTER
R14 TO VM INT STACK PTR REGISTER

TEST PSL (CUR MOD) TO DETERMINE
CURRENT OPERATING MODE

TRANSFER CONTENTS OF STACK PTR
REGISTER R14 TO USER STACK PTR,
SUPER STACK PTR, EXEC STACKPTR
OR KERNEL STACK PTR REGISTER
DEPENDING ON CURRENT OPERATING MODE

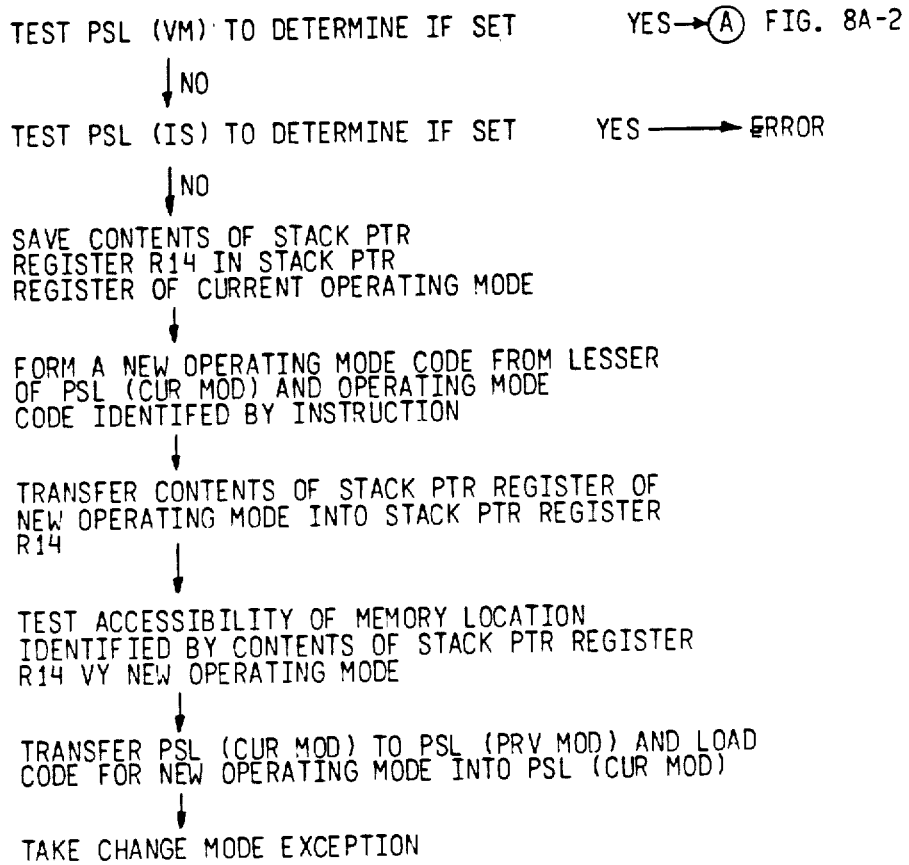

FIG. 8A-1
CHANGE OPERATING MODE
(TO SELECTED OPERATING MODE)

TEST PSL (VM) TO DETERMINE IF SET     YES→(A) FIG. 8A-2
↓ NO

TEST PSL (IS) TO DETERMINE IF SET     YES ——→ ERROR
↓ NO

SAVE CONTENTS OF STACK PTR
REGISTER R14 IN STACK PTR
REGISTER OF CURRENT OPERATING MODE
↓

FORM A NEW OPERATING MODE CODE FROM LESSER
OF PSL (CUR MOD) AND OPERATING MODE
CODE IDENTIFED BY INSTRUCTION
↓

TRANSFER CONTENTS OF STACK PTR REGISTER OF
NEW OPERATING MODE INTO STACK PTR REGISTER
R14
↓

TEST ACCESSIBILITY OF MEMORY LOCATION
IDENTIFIED BY CONTENTS OF STACK PTR REGISTER
R14 VY NEW OPERATING MODE
↓

TRANSFER PSL (CUR MOD) TO PSL (PRV MOD) AND LOAD
CODE FOR NEW OPERATING MODE INTO PSL (CUR MOD)
↓

TAKE CHANGE MODE EXCEPTION

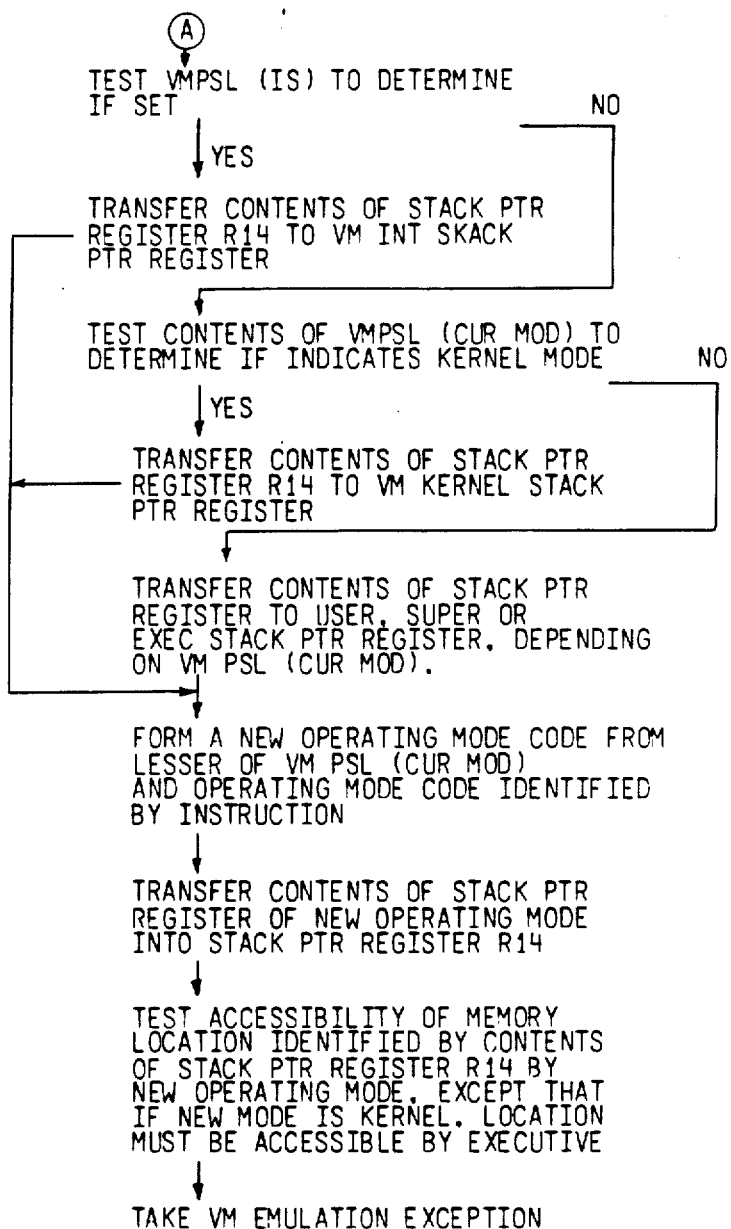

FIG. 8B-1

VMCHM EMULATION

FORM NEW VMPSL IN NEW VMPSL TEMP REGISTER
↓
LOAD "ZERO" INTO (VM), (IS), (DV), (FU), (IV), (T), (N), (Z), (V), AND (C) FIELDS OF NEW VMPSL TEMP REGISTER.
↓
TRANSFER CONTENTS OF VMPSL (IPL) INTO LOCATION OF NEW VMPSL TEMP REGISTER CORRESPONDING TO VMPSL (IPL) FIELD
↓
TRANSFER CONTENTS OF VMPSL (CUR MOD) INTO LOCATION OF NEW VMPSL TEMP REGISTER CORRESPONDING TO VMPSL (PRV MOD) FIELD
↓
TRANSFER CONTENTS OF VMPSL (CUR MOD) OR SELECTED MODE CODE, WHICHEVER IS LESS, TO LOCATION IN NEW VMPSL TEMP REGISTER CORRESPONDING TO VMPSL (CUR MOD) FIELD
↓
TRANSFER CONTENTS OF KERNEL, EXEC, SUPER OR USER STACK PTR, DEPENDING ON CONTENTS OF LOCATION OF NEW VMPSL TEMP REGISTER CORRESPONDING TO VMPSL (CUR MOD) FIELD, TO NEW STACK PTR TEMP REGISTER
↓
PROBE STACK IN MEMORY IDENTIFIED BY CONTENTS OF NEW STACK PTR TEMP REGISTER TO DETERMINE WHETHER LOCATIONS ARE ACCESSABLE TO OPERATING MODE IDENTIFIED BY FIELD OF NEW VMPSL FIELD CORRESPONDING TO VMPSL (CUR MOD) FIELD
↓
Ⓐ  FIG. 8 B-2

TRANSFER CONTENTS OF PROGRAM COUNTER
REGISTER R15 AND VMPSL REGISTER ONTO
STACK IDENTIFIED BY NEW STACK PTR
TEMP REGISTER

↓

TRANSFER CONTENTS OF NEW STACK PTR
TEMP REGISTER TO VM KERNEL, SUPER,
EXEC OR USER STACK PTR REGISTER,
DEPENDING ON CONTENTS OF FIELD OF
NEW VMPSL TEMP REGISTER CORRESPONDING
TO VMPSL (CUR MOD) FIELD

↓

TRANSFER CONTENTS OF NEW VMPSL TEMP
REGISTER TO VMPSL REGISTER

↓

CREATE PSL CORRESPONDING TO NEW
VMPSL. LOAD (DV), (FU), (IV),
(T), (N), (Z), (V) AND (C) FIELDS
FROM VMPSL INTO CORRESPONDING
FIELD OF A NEW PSL TEMP REGISTER

↓

LOAD EITHER A "ONE" OR VMPSL (CUR MOD),
WHICHEVER IS LARGER, INTO LOCATION OF
NEW PSL TEMP REGISTER CORRESPONDING TO
PSL (CUR MOD) FIELD.

↓

LOAD LARGER OF A "ONE" OR VMPSL (PRV MOD)
INTO LOCATION OF NEW PSL TEMP REGISTER
CORRESPONDING TO PSL (PRV MOD) FIELD

↓

LOAD "ONE" INTO LOCATION OF NEW PSL
TEMP REGISTER CORRESPONDING TO PSL
(VM) FIELD

PROBE ACCESSIBILITY OF MEMORY LOCATION

INSTRUCTION FORMAT

PROBE (MODE) (NO. BYTES) (BASE ADRS)

ESTABLISH PROBE MODE AS MAXIMUM OF MODE FROM PROBE INSTRUCTION AND PSL (PRV MOD) FIELD
↓
ESTABLISH FLAG "A"
↓
SET FLAG "A" IF BOTH BYTE AT BASE ADRS AND BYTE AT BASE ADRS PLUS NO. BYTES (LESS ONE) ARE ACCESSIBLE TO PROBE MODE. OTHERWISE CLEAR FLAG "A"
↓
ESTABLISH FLAG "B"
↓
SET FLAG "B" IF BOTH BYTE AT BASE ADRS AND BYTE AT BASE ADRS PLUS NO. BYTES (LESS ONE) ARE ACCESSIBLE TO SUPERVISOR. OTHERWISE CLEAR FLAG "B"
↓
TEST PSL (VM) TO DETERMINE IF SET —— NO ——┐
↓ YES                 │
IF PROBE MODE IDENTIFIES EXECUTIVE MODE AND FLAG "A" IS SET AND FLAG "B" IS CLEAR, INITIATE A VM EMULATION EXCEPTION  │
↓                 │
IF FLAG "A" IS SET AND THERE HAS BEEN A TRANSLATION FAULT, INITITATE A VM EMULATION EXCEPTION  ┘
↓
END

COMPUTER WITH VIRTUAL MACHINE MODE AND MULTIPLE PROTECTION RINGS

BACKGROUND OF THE INVENTION

1. Field of the Invention

The invention relates generally to the field of digital data processing (computer) systems, and more specifically to computer systems which operate in a virtual mode to provide one or more virtual machines and which have more than two protection rings arranged in a hierarchy and regulating access to locations in memory and the executability of certain instructions. It is desirable to have the computer preserve the most privileged protection ring for the real mode to allow an orderly transition and allocation of resources of the computer system among users in the virtual mode. By means of the invention, at least two of the protection rings of the virtual mode are compressed, that is, they are made to correspond to a single protection ring used by the processor while processing in a real (non-virtual) mode. The compression is such that at least the most privileged ring of the machine operating in the real mode has no corresponding ring in the virtual mode. Otherwise stated, the most privileged ring of the processor operating in the virtual mode corresponds to a less than maximally privileged ring of the processor when it operates in the real mode, and two of the rings of the virtual mode correspond to one of the rings of the real mode. Accordingly, compression allows the computer to appear to have at least as many protection rings in the virtual mode as is provided in the real mode.

2. Description of the Prior Art

A digital data processing system generally includes a processor, a memory, and one or more input/output units, all of which are interconnected by one or more buses. The memory stores data in addressable storage locations. This data includes both operands and instructions for processing the operands. The processor causes data to be transferred to, or fetched from, the memory unit, interprets the incoming data as either instructions or operands, and processes the operands in accordance with the instructions. The results are then stored in addressed locations in the memory. The input/output units also may communicate with the memory in order to transfer data into the system and to obtain processed data from it. The input/output units normally operate in accordance with control information supplied to them by the processor. The input/output units may include, for example, printers, teletypewriters or video display terminals, and they also include secondary data storage devices such as disk drives or tape drives.

When computer systems first became commercially available, they were substantially larger, more expensive, and significantly slower than present day systems. Typical early systems processed one program at a time, from initially receiving the instructions and data, through the processing operations, and finally printing the results; before beginning another program.

As the cost of memory and logic circuits decreased and as the logic circuits became faster, memories became larger and processing speeds increased. As a result, computer systems were developed in which several programs could be loaded into memory at one time and processed in an interleaved fashion. If, for example, one program needed to use a system resource, such as a slow input/output device like a printer or a disk drive, which was then being used for another program, the computer system's management programs, that is, the operating system, could schedule the processing of portions of other programs until the device was available. When the resource became availiable, the operating system would then return to processing the first program. This "multi-programming" allowed for a more continuous use of all of the computer resources by switching among programs when needed resources were not immediately available.

In view of the expense of early computer systems, many users were unable to justify the cost of an entire computer system. Computer systems were devised that allowed users to access them on a "time sharing" basis. In time sharing systems, a number of users could concurrently run different applications in a single system. The operating system kept track of the data and instructions from each user, scheduled the running of the applications programs on a rotating basis, and transmitted the processed data to the users when the processing was completed.

A problem with typical time sharing systems is that they generally used a single time sharing operating system under which all of the applications programs were run. Some types of applications programs ran better under certain operating systems than others, but the operating systems used in the time sharing systems did not permit the selection of other operating systems that may have been better for particular applications.

Furthermore, typical time sharing systems did not allow a fairly direct access by the user to the system resources. For example, while a real computer system included identifiable input/output units such as disk drives and tape drives, printers, and so forth, and virtual or relocatable memories including identifiable pages and/or segments, these features were hidden from the user by the operating system. The user was not able to access a particular location on a disk or a particular location in memory in a time sharing system.

To enable users to select among various operating systems, and to process as though they had direct access to system resources, virtual machine architectures were developed in which a virtual machine monitor essentially multiplexed system resources among a number of users. The virtual machine monitor, a program, provided each user with a virtual machine which appeared to the user to have the resources equivalent to an entire computer system. Such virtual machines may have corresponded to, or have had, the resources of the computer system, a subset of the resources of the computer system or additional resources that were not physically present in the computer system, and they may have been architecturally quite different from the computer system providing the virtual machines. Indeed, the virtual machines may have had different instruction sets from the instruction sets of the actual computer system providing the virtual machines. The computer system itself, including the virtual machine monitor, was termed a "real" machine, or a machine operating in a "real" mode, whereas the set of resources available to the user was termed a "virtual" machine, or a machine operating in a "virtual" mode. A virtual machine user could directly use any of the operating system and applications programs which would also run on a real machine and appeared to have direct access to the system resources that were provided to the virtual machine by the virtual machine monitor.

Since computer systems may be used by many users at the same time, they generally include features which provide a barrier between the users' applications programs and the system resources, to protect the system resources from possible damage by the user programs. For example, many systems include resources such as compilers and interpreters for converting programs written in high-level languages to machine code executable by the processor. It is generally undesirable to allow a user program to directly access memory locations allocated to the compilers or interpreters. Similarly, it is generally undesirable to allow a user program to directly access privileged areas of memory containing programs or to use "privileged" instructions which are be used by the operating system to manage the computer system's resources. As an example, it is undesirable to allow a user program to halt the processor, and so any such instruction is privileged. That is, the instruction may only be in an operating system program with the processor operating in a privileged operating mode.

Accordingly, computer systems have been provided with "protection rings" having a hierarchy of protection levels which control system resources from other programs, such as user programs, and which allow access to those programs only in a controlled manner. Some computer systems, such as those sold by International Business Machines Corporation (IBM), have two protection rings implemented as a supervisor mode and a problem mode. The problem mode allows execution of applications programs, and the supervisor mode allows execution of all other types of programs.

Other computer systems, such as the VAX-11 family of systems sold by the assignee of the present invention, have more protection rings providing various protection levels. In the aforementioned VAX-11 family, four protection rings are provided, called the the kernel, executive, supervisor, and user operating modes, in order of decreasing privilege. The input/output functions and transfers to and from memory are performed in the kernel mode, which is the only mode in which privileged instructions can be executed. Various system resources such as the compilers and interpreters, and some programs which control video display terminals may be handled in programs executed in the executive and supervisor modes, and the applications programs are processed in the user mode.

The VAX-11 systems use the operating modes in two ways. First, if a program instruction is a privileged instruction, the processor determines if it is then operating in a mode, generally required to be the kernel mode, in which it can execute the instruction before it actually executes the instruction. If it is in the required operating mode, it executes the instruction, and otherwise traps to an exception routine.

The other way in which it uses the operating modes is to check whether the current program can read from and/or write to, that is, access, a location in memory. Each location in memory, or more specifically each page, since the VAX-11 has a paged virtual memory, is accessible only when the processor is in a predetermined operating mode. Furthermore, each page may be accessible in a particular way; for example, a page may be read by programs in particular operating modes but not written, or it may be read and/or written by programs in various combinations of operating modes. For example, when the processor is processing programs in another mode than kernel mode, it may not be able to access portions of memory reserved to programs which operate in kernel mode. However, in some cases, portions of memory which can be written by programs processed in the kernel operating mode may also be read but not written, or both read and written, by programs processed in other operating modes.

Providing a virtual machine in a computer system having protection rings has proven to be difficult, except in the degenerate case of two protection rings as provided by systems sold by IBM. In the IBM systems, the virtual machine monitor is run in the supervisor mode, and all other programs, including operating system programs, are run in the real machine's problem mode.

However, no known computer system with more than two protection rings has been also provided with a virtual mode of operation. A number of techniques have been proposed for providing such a virtual mode, including:

1. Mapping the virtual rings into the same real rings and forcing all instructions executing in the most privileged ring of the virtual machine to trap to the virtual machine monitor. The virtual machine monitor would then emulate those instructions. This would, however, result in an undue expansion of the virtual machine monitor, as the virtual machine monitor would have to include emulation routines for all instructions in the processor's instruction set, whether or not the instructions are privileged and whether or not the procedure used by the processor to execute the instructions is altered by the addition of the virtual machine capability. Furthermore, emulation of all of the instructions in the most privileged ring would result in a substantial reduction of the performance of the system, as emulation of instructions requires substantially more time than execution by the processor directly.

2. Adding a ring relocation register to the computer system to add a constant to each virtual ring number to obtain the corresponding ring number as seen by the computer system. However, the virtual machine would be provided with fewer protection rings than the real machine, with the difference being determined by the value in the ring relocation register. This is undesirable if it is desired to allow the virtual machine to emulate the real machine, which requires the virtual machine to have the same number of rings as the real machine.

3. Mapping a virtual ring onto the next higher numbered real ring (that is, onto the next less privileged real ring) but mapping two adjacent virtual rings into the same real ring. This was asserted to be difficult because of the potential visibility of the ring number to the program being processed. Another potential problem concerned the absolute interpretation of the physical ring number in connection with certain instructions. For example, in the aforementioned VAX-11 architecture, the ring numbers are visible in the CHANGE MODE instructions which change the current operating mode between the kernel, executive, supervisor and user operating modes.
[See, for example, R. P. Goldberg, *Architectural Principles for Virtual Computer Systems* (Ph.D. thesis, Harvard University, Cambridge, Mass., ESD-TR-73-105, HQ Electronics Systems Division, Hanscom Field, Bedford, Mass., February 1973)]

As has been noted, the protection rings are used to regulate access to pages in memory and to inhibit the processor from executing certain privileged instructions unless it is in a predetermined operating mode. Thus, when the processor begins processing the instruction, it must make two determinations. First, the processor determines that the instruction is executable in the current operating mode. Second, the processor determines that the operands, if any, are in memory, and that they are in pages that are available to the operating mode in which the program is running; that is, the processor determines that a page fault or access violation will not occur when it attempts to retrieve the operands. Both of these operations are referred to as "probes". In the VAX-11, the access code indicating the availability of the pages containing the operands are provided in the page table entry which is used in translating virtual addresses to physical addresses.

In all known processors, the processors first determine whether they can execute an instruction before testing the accessibility of the operands. However, if the processor traps to a virtual machine monitor to emulat the instruction, the monitor must determine the accessibility of the pages containing the operands. Providing this capability in the virtual machine monitor is, however, essentially redundant of the same capability in the processor.

SUMMARY OF THE INVENTION

In brief summary, the invention provides a new system in which the processor provides more than two protection rings defining a hierarchy of protection levels each associated with an operating mode, and further including a virtual machine monitor which provides virtual machines, comprising the actual computer system with the processor operating in a virtual mode, to a plurality of users. Two or more of the operating modes of the processor in the virtual mode are compressed so as to be treated as a single mode in the real, or nonvirtual, mode, such that (1) the most privileged operating mode in the real mode has no corresponding virtual operating mode and the most privileged operating mode in the virtual mode is less privileged than the most privileged operating mode in the real mode and (2) the least privileged operating mode of the virtual mode is at least as privileged as the least privileged operating mode of the real mode.

In one embodiment, the most privileged and second most privileged virtual operating modes are compressed to correspond to the second most privileged physical operating mode. This is accomplished as follows. A separate status word is provided for the virtual mode, and a separate stack pointer is provided which is used for one of the compressed virtual operating modes. The virtual machine monitor may emulate an instruction, and, when it probes the accessibility of a location in memory to programs operating in the most privileged virtual operating mode, it actually tests the location's accessibility to programs operating in the second most privileged operating mode. To a program processed by the processor in the virtual mode, the processor appears to include the full number of protection rings provided to the real machine.

In another aspect of the invention, each time an instruction is retrieved, the processor first probes to determine if the operands are in memory and accessible to the program in the current operating mode. If they are, the processor probes the operation code to determine if the instruction can be executed in the current operating mode. If it can be, the processor retrieves the operands and executes the instruction. If the processor is operating in a virtual mode, and specifically in the most privileged operating mode thereof, it may trap to the virtual machine monitor to handle the instruction. The order in which the operands and instructions are probed allows the virtual machine monitor to be simplified, since it does not have to determine whether the operands are accessible by the program in the current operating mode after the trap to the monitor.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2B is a table illustrating the correspondence between operating mode numbers and the various operating modes depicted in FIG. 2A;

FIGS. 3A, 3B and 3C illustrate the registers provided in the computer system depicted in FIG. 1A;

FIG. 3D-1 and 3D-2 illustrates various fields in a processor status longword and a virtual machine processor status longword in the computer system depicted in FIG. 1A;

FIGS. 5, 6, 7A-1, 7A-2, 7A-3, 7A-4, 7A-5, 7A-6, 7A-7, 7B, 7C, 7D, 7E, 8A-1, 8A-2, 8B-1, 8B-2, and 8B-3, 9 illustrate the operations performed by the processor depicted in FIG. 1A in processing various instructions.

DETAILED DESCRIPTION OF AN ILLUSTRATIVE EMBODIMENT

1. General Description

The invention will be described in connection with a VAX-11 computer system sold by the assignee of the present application. A prior VAX-11 computer system, which does not include the invention, is described in the VAX-11 Architecture Reference Manual, Publication No. EKVAXAR-RM-001, Revision 6.1, May 20, 1982, sold by the assignee of this application, which is incorporated herein by reference.

Figure 1B:
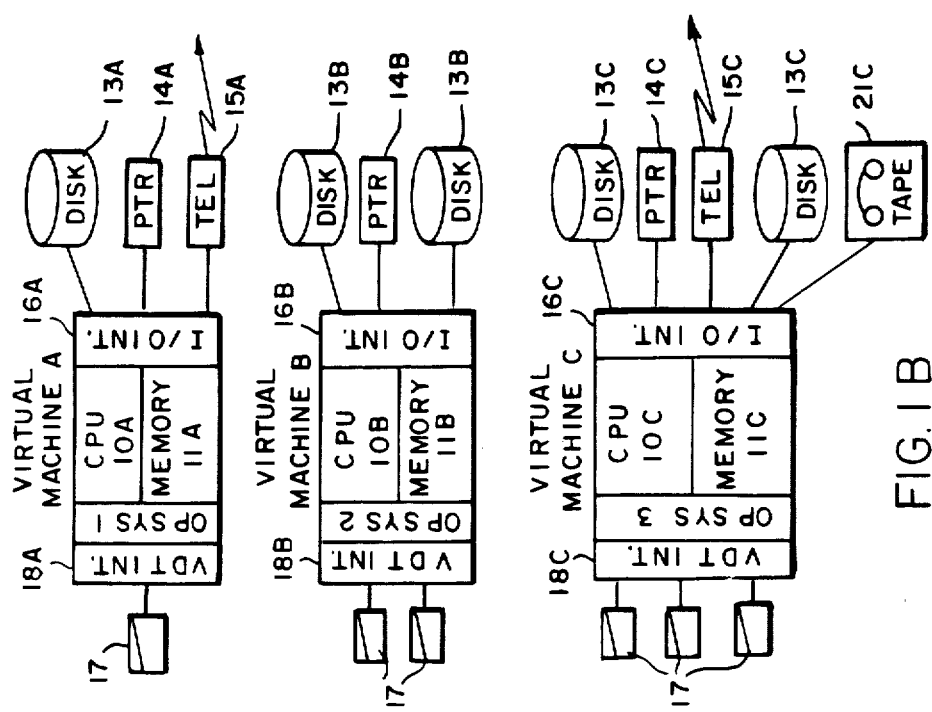
FIG. 1B illustrates, the allocation of resources of the computer system depicted in FIG. 1A to three virtual computer systems.
Figure 1A:
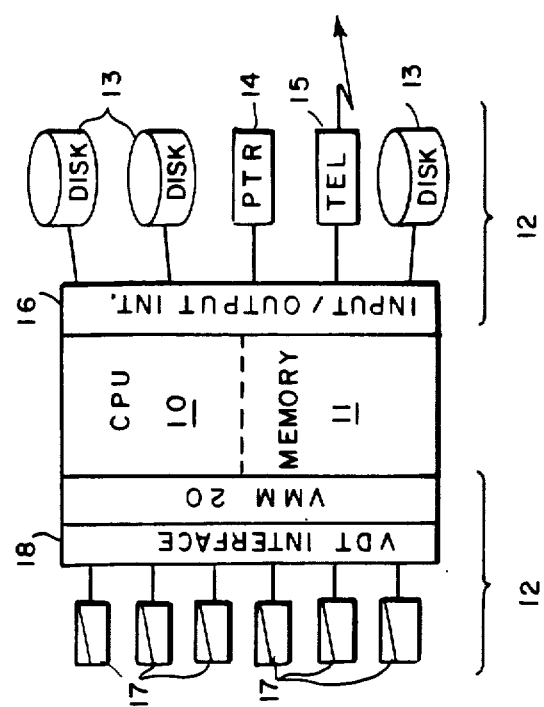
FIG. 1A illustrates, in general block diagram form, a computer system constructed in accordance with the invention.

As exemplified in FIG. 1A, a computer system constructed in accordance with the invention comprises a central processor unit 10, a memory 11, and one or more input/output units 12. The processor 10 executes instructions that are stored in addressable storage locations in the memory 11. The instructions identify operations that are to be performed on operands, which are also stored in addressable locations in the memory. The instructions and operands are fetched by the processor 10 as they are needed, and processed data are returned to the memory for storage.

The processor also transmits control information to input/output units enabling them to perform selected operations, such as transmitting data to or retrieving data from the memory 11. Such data may include instructions, operands which may be transmitted to the memory for later processing by the processor 10 or processed data which is retrieved from the memory for storage, display or transmission to other systems.

An operator's console (not shown) connected to the processor 10 serves as the operator's interface. It allows the operator to examine and deposit data, halt the operation of the processor, or step the processor through a sequence of instructions and determine the responses of the processor in response thereto. It also enables an operator to initialize the system through a bootstrap procedure, and perform various diagnostic tests on the entire data processing system.

The data processing system may include several types of input/output units, including for example, secondary storage units such as disk drives 13, printers 14, and communications interfaces 15 allowing transmission of data to, or receipt of data from telephone lines or microwave links or the like, all connected to the CPU and memory through one or more interfaces 16. In addition, the input/output units 12 include one or more video display terminals 16 which are also connected to the processor and memory through interfaces 17 to allow the users to use the system.

The system depicted in FIG. 1A also includes a virtual machine monitor 20 which makes available the resources provided by CPU 10, memory 11, and the storage, communication and printing units connected thereto, and other resources which are not physically present in these units but which may be emulated by them, to users on the various video display terminals 17. By means of virtual machine monitor 20, the system depicted in FIG. 1A appears to be several separate systems, termed "virtual machines" as depicted in FIG. 1B, which can appear to have different resources and operating systems.

FIG. 1B illustrates the resources provided by three exemplary virtual machines which are actually provided by the computer system of FIG. 1A. The virtual machines, denominated by the letters "A", "B", and "C", each includes a CPU, memory, and various portions of input/outputs 12 (FIG. 1A), and each includes one or more of the video display terminals 17. For example, virtual machine "A" (FIG. 1B) includes a single video display terminal 17 connected through an interface 18A and running an operating system OP SYS 1. The virtual machine "A" provides the resources of a CPU 10A, which may correspond to CPU 10. It also provides the resources of a memory 11A, input/output interface 16A, a disk facility 13A, a printer facility 14A, and communications through a communications interface facility 15A. The memory 11A may correspond to, that is, have as many locations as, memory 11, or it may correspond to a subset of memory 11 in the real machine depicted in FIG. 1A, or it may appear to have more locations than the real machine. The virtual machine monitor may emulate the additional memory locations by storing unused data on the disk drives 13 in the real machine. Similarly, the disk facility 13A may correspond to a disk 13 in FIG. 1A, or it may correspond to one or more sectors, tracks, or cylinders on one or more of the disks 13 in a real machine depicted in FIG. 1A. Similarly, the virtual machine "A" includes a printer facility 14A. Printer facility 14A represents the use by the virtual machine A of the printer 14 (FIG. 1A) by the virtual machine A. Similarly, the communications interface facility 15A represents the use by virtual machine A of the communications interface 15.

The virtual machine B includes a CPU 10B and memory 11B which communicate with two video display terminals 17 through an interface 18B. The virtual machine B runs operating system OP SYS 2, and includes two disk drive facilities and 13B, a printer facility 14B connected through an input/output interface 16A. It has no communications interface. It will be appreciated that the sizes and control requirements of the disk facilities 13B and 13A may differ, and the availability of the printer facilities 14A and B to the users of the virtual machines may also differ.

The virtual machine "C" includes a CPU 10C, memory 11C, input/output interface 16C, two disk facilities 13C, a printer facility 14C, a communications interface facility 15C and a tape facility 21C. The virtual machine may emulate the tape facility in the real memory 11 or a real disk drive 13, for example. The virtual machine "C" also includes three video display terminals 17 connected to the CPU and memory through a VDT interface facility 18C. The virtual machine "C" runs an operating system OP SYS 3 which may differ from operating systems OP SYS 1 and 2.

As will be appreciated by those skilled in the art, the CPU facilities 10A, 10B and 10C are provided by the processor 10 (FIG. 1A) in the real machine, except that the CPU facilities will appear to be slower since the virtual systems are actually multiplexed onto the system depicted in FIG. 1A. The CPU facilities may have the same instruction set and register resources and they may process data in the same manner as processor 10, as seen by the users, or they may be emulations of processors having other instruction sets and register resources and they may process data in a different manner as the processor 10.

The memory facilities 11A, 11B, and 11C may be identical to memory 11, proper subsets of memory 11 or, as noted above, they may appear to have more locations than in the real physical memory. Similarly, the disk facilities 13A, 13B and 13C may correspond to specific disks 13 in FIG. 1A, or they may correspond to one or more sectors, tracks, or cylinders in the physical disks 13 in the system depicted in FIG. 1A. Additionally, the printer faciities 14A, 14B and 14C may correspond to a real printer or to areas in the memory 11 or disks 13, and communications interface facilities 15A and 15C may also correspond to certain lines of the communications interface 15 or to areas in disks 13 in FIG. 1A.

The VDT interface facilities 18A, 18B and 18C also correspond to the portions of the VDT interface 18 in the system of FIG. 1A for each terminal 17.

The virtual machine facilities in virtual machines "A", "B" and "C" are managed by virtual machine monitor 20. The manner in which a typical virtual machine monitor operates is well known by those skilled in the art. See, for example Madnick and Donovan, *Operating Systems* (McGraw Hill, 1974) at pages 549 et seq.

2. Protection Rings and Operating Modes

Figure 2A:
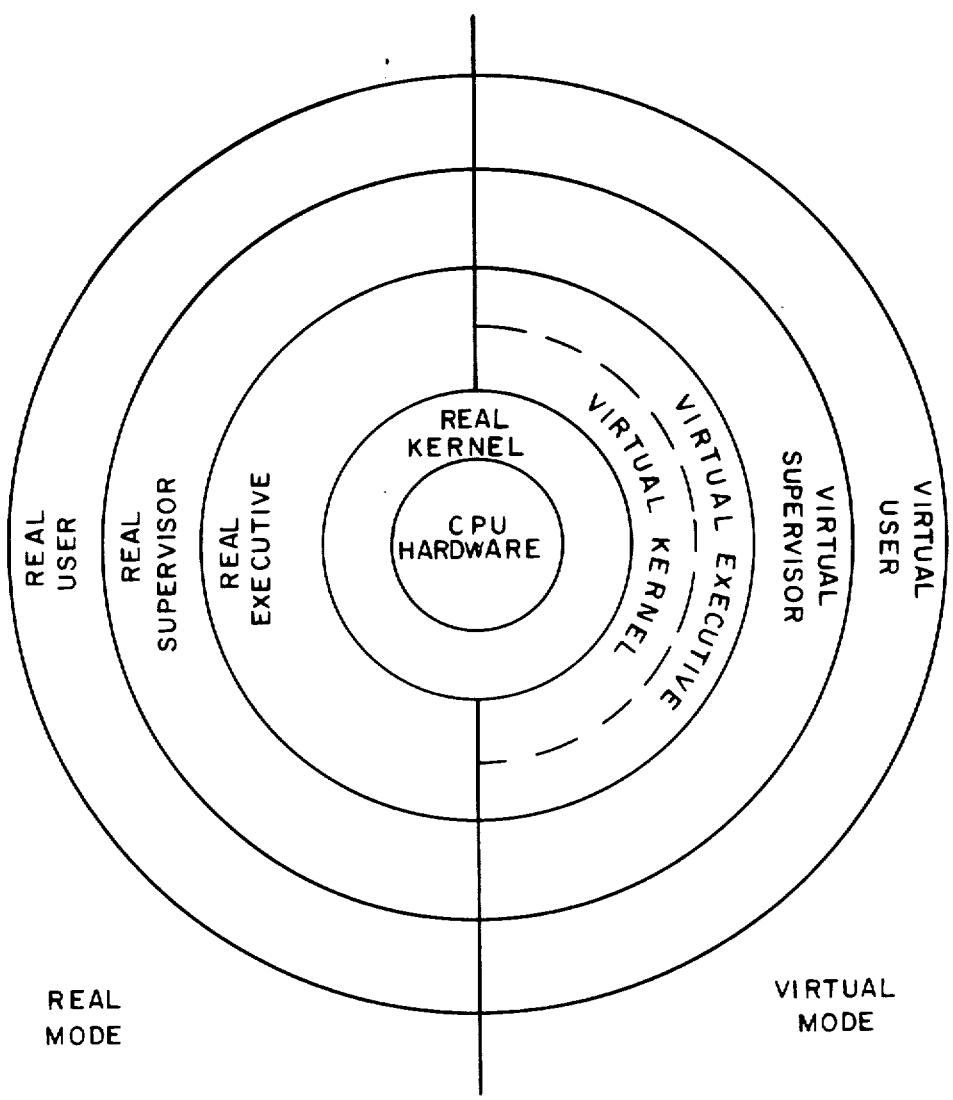
FIG. 2A is a diagram illustrating the various operating modes available on the real and virtual machine and the privilege relationship between different operating modes.

With reference to FIG. 2A, the computer system depicted in FIG. 1A has four operating modes forming protection rings defining a hierarchy of privilege levels having numerical reference identifications as set forth in FIG. 2B. The protection rings prevent programs in an outer, that is, less privileged, ring from interfering with programs or data in a relatively inner, that is, more privileged, ring. The computer system has two sets of operating modes, one set for the virtual mode and the other for the real (non-virtual) mode, with the most privileged operating mode of the real mode also being used by the system when it is in the virtual mode. A program in, for example, the real user operating mode may not access locations in memory allocated to the real supervisor, executive or kernel mode but it may call on programs in those operating modes for service to perform various operations for it.

The use of protection rings, and the choice of assignment of programs to specific rings, is well known in the art. In one specific embodiment, the real kernel includes programs which manage the system resources, including programs which manage input/output units 12, and various resources of processor 10 and memory 11. Specifically, if a program includes instructions which attempt to access, for example, control locations in the disk drives 13, printer 14 or communications interface 15, the instruction will not be executed unless the processor is operating in the real kernel mode. Similarly, certain instructions, such as HALT, which causes the processor 10 to halt or to stop operations, will not be executed unless the processor is operating in the real kernel mode. If a program being executed in virtual mode includes such an instruction, the virtual machine monitor will emulate the instruction. In the case of the HALT instruction, for example, the virtual machine monitor halts the operation of only the virtual machine whose programs included the instruction, allowing the other virtual machines to continue operation.

The programs allocated to the supervisor and executive of the operating system depend upon engineering considerations. For example, a compiler and interpreter may be in the executive ring, and programs which manage the display terminals 17 may be in the supervisor ring. The user programs may include, for example, applications programs such as word processing, accounting, or computer assisted design programs, or the like.

In accordance with the invention, the virtual machine monitor 20 also provides virtual operating modes providing four protection rings, including a virtual user ring, which corresponds to the real user ring, a virtual supervisor ring corresponding to the real supervisor ring, and a virtual executive and virtual kernel ring, both of which are compressed so as to correspond to the real executive ring. When the processor 10 operating in the virtual mode, and specifically in the virtual kernel operating mode, attempts to execute a privileged instruction, which can only be processed with the processor being in the kernel-mode, the processor executes the instruction using microcode or software routines which first determine whether the processor is operating in a virtual mode or a real mode, since the operation of the processor will vary depending on whether it is operating in a virtual or real mode. If the routines are in software, they form part of the virtual machine monitor, and are used to emulate the instruction. Examples of the routines used to execute several such instructions in the VAX-11 architecture are presented in FIGS. 5 through 9, which are described below.

In accordance with the invention, when the processor in the virtual mode executes a kernel operating mode instruction, if that instruction requires access to memory, the processor determines whether it can access the memory location based on the accessibility of the location to executive operating mode. If the processor is in the virtual executive operating mode, and if it executes an instruction which requires access to memory, the processor also determines whether it can access the memory location based on the accessibility of the location to the executive operating mode. Thus, both the virtual kernel and virtual executive operating modes provide the same protection as the real executive operating mode, and programs operating in the virtual kernel operating mode are not able to access locations in memory for the real kernel operating mode.

3. Specific Illustrations of Systems

Figure 2C:
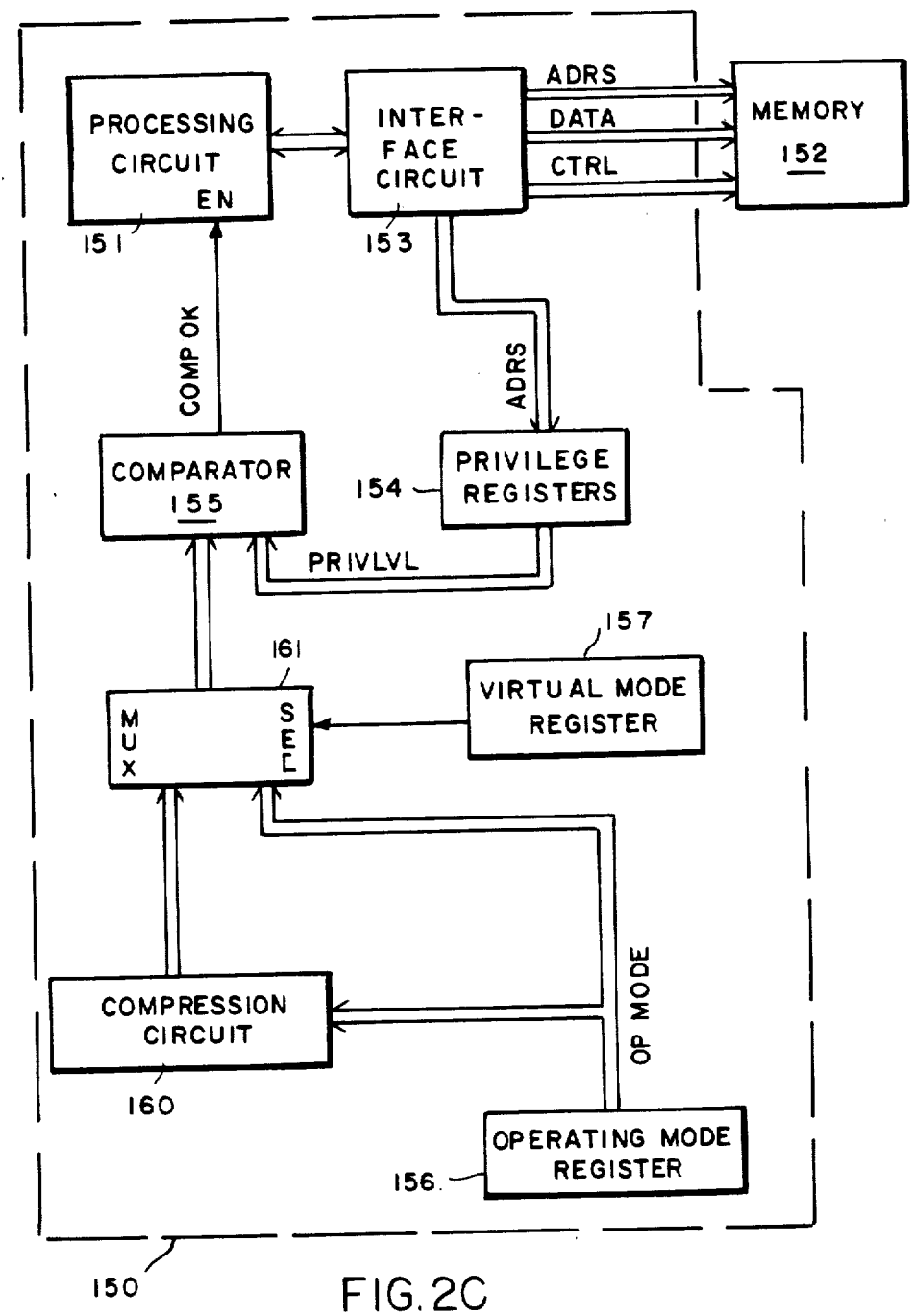
FIGS. 2C and 2D are diagrams that are useful in illustrating specific computer systems for carrying out the invention.

Two systems for carrying out the invention will be described in connection with FIGS. 2C and 2D. With reference to FIG. 2C, a processor 150 includes a processing circuit 151 that includes conventional data paths and control circuitry for executing instructions. The instructions and data are retrieved from a memory 152 by an interface circuit 153 in response to requests therefor from the processing circuit 151.

As is conventional, the memory 152 includes a plurality of addressable storage locations (not shown) in which data and instructions are stored. Associated with each location is a privilege level storage register, the collection of which is indicated by the reference numeral 154, which may reside in the memory or in the processor. The privilege level storage register stores the privilege level required to read or read/write the location. In the system depicted in FIG. 2C, the privilege level storage registers are depicted as residing in the processor 150.

When the interface circuit reads the contents of, or writes data to, a location in memory 152, it also transmits the ADRS address signals, which identify the location in memory 152 being read or written, to the privilege registers 154. The contents of the register associated with the address are transmitted as PRIV LVL privilege level signals to one input terminal of a comparator 155.

The processor 150 also includes an operating mode register 15, which indicates the operating mode in which the processor is operating, and a virtual mode register 157, which indicates whether the processor is operating in a virtual or real, that is, non-virtual, mode. The contents of the operating mode register are transmitted as OP MODE operating mode signals to a compression circuit 160 and to one input terminal of a multiplexer 161. The other input terminal of the multiplexer is connected to the output terminal of the compression circuit 160 to receive COMP MOD compressed mode signals therefrom.

The COMP MOD compressed mode signals from the compression circuit 160 are used by the processor 150 when it is in the virtual mode to determine whether the processor can access the addressed location in memory 152. If the processor is in virtual mode, the contents of the virtual mode register enables multiplexer 161 to couple the COMP MOD compressed mode signals as SEL MOD selected mode signals to comparator 155. However, if the processor is not in virtual mode, the contents of the virtual mode register enables the multiplexer 161 to couple the uncompressed OP MOD operating mode signals as the SEL MOD selected mode signals to comparator 155.

The comparator 155 also receives the PRIV LVL privilege level signals from the privilege registers 154 and asserts a COMP OK comparison satisfactory signal if the SEL MOD signal indicates that the processor has the required operating mode level to access the addressed location. If the COMP OK signal is asserted, the processing circuit 151 is enabled to execute the instruction; otherwise the processing circuit is inhibited from executing the instruction.

The compression circuit 160 generates the COMP MOD compressed mode signals in accordance with a compression function "F" which maps the elements of a set $A = (0, 1, \ldots, N)$, which represent the privilege levels of the processor operating in a virtual mode, onto a set $B = (0, 1, \ldots, N)$, which represent the privilege levels which will be enforced by the processor, with "N" being greater than or equal to "2" (that is, there are at least three privilege levels). In both sets, the successive elements represent the levels of decreasing privilege, as depicted in FIG. 2B. In accordance with the invention, the function "F" may be any function which satisfies the following conditions:

i. F (0) is greater than "0", and ii. if "i" and "j" are elements of set "A" such that "i" is greater than or equal to "j", then F (i) is greater than or equal to F (j).

In the embodiment of the invention described above in connection with FIGS. 2A and 2B, the following compression function is used:

i. F (0) = 1, and ii. if "i" is greater than "0" and less than or equal to "N", then F (i) = i.

Thus, if the processor in virtual mode and kernel operating mode (which has privilege level "0", as shown in FIG. 2B) desires to access a location in memory, the location must be accessible to programs operating in executive mode (which has privilege level "1"). If the processor in virtual mode and in excutive, supervisor or user operating modes (which have privilege levels "1", "2" and "3", respectively) desires to access a location in memory, the location must be accessible to programs operating in the executive, supervisor and user modes, respectively.

As is apparent to those skilled in the art, the privilege registers 154 may reside in memory instead of the processor, and the interface circuit 153 may retrieve the contents of the register associated with the location to be retrieved prior to the retrieval of the location. This may be particularly useful in connection with systems in which the memory is a virtual memory, as the privilege registers may form part of the virtual address to physical address translation system.

As an alternative to the system depicted in FIG. 2C, the system could store in the privilege registers 154 the compressed privilege level to which the associated locations will be accessible.. If this is done, the compression operation need not be performed for every memory access. This alternative will be described in connection with FIG. 2D, in connection with a demand-paged virtual memory, using the VAX-11 architecture as an example.

The VAX-11 architecture described in the aforementioned VAX-11 Architecture Reference Manual has a demand-paged virtual memory, in which program references to memory locations, that is, virtual addresses, identify locations in a virtual memory space, and the VAX-11 computer system translates those addresses to physical addresses which identify actual locations in the physical memory in which the desired data is stored. The virtual memory space is divided into pages of a predetermined number of byte locations, in one embodiment five hundred and twelve byte locations, and the physical memory is divided into blocks of a like number of locations. When a program requires access to one such location in the virtual memory space, the computer system references a page table which has a plurality of entries, that is, "PTEs". Each PTE contains a page frame number which is used to identify the blocks in physical memory in which the referenced page of the virtual memory space is located. Each entry also has an A/R access rights field which identifies the operating modes which have access to the locations within the block and how those locations may be accessed, that is, whether programs in the operating modes may read or write the locations therein. Each entry also has a V valid field which indicates that the entry is a valid entry and may be used for translation, and an M modify field which, when in a predetermined condition, indicates that a location in the block has been modified by a write operation to the memory. The page tables are established in a known manner by memory management programs in the computer's operating system.

Figure 2D:
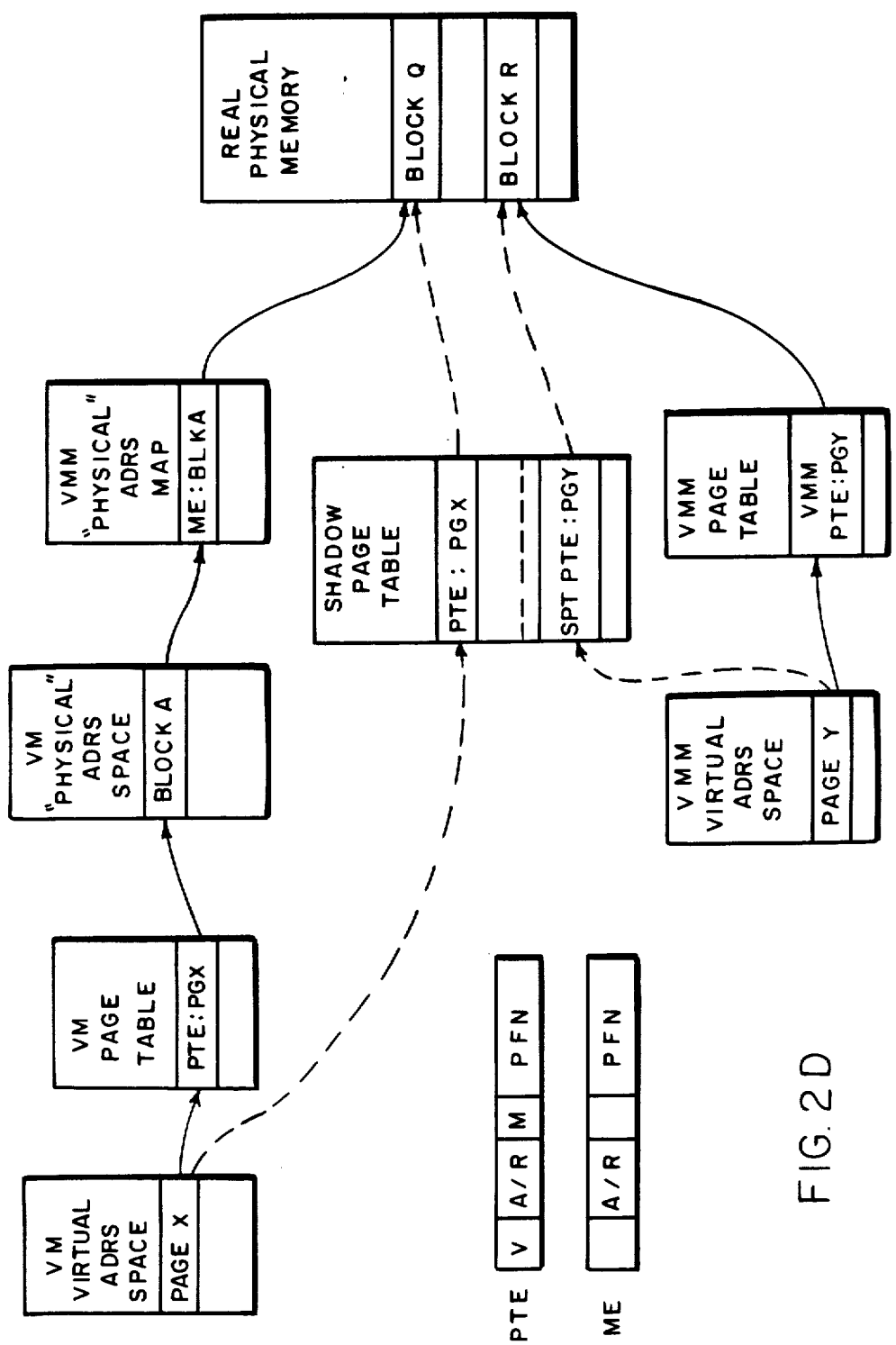

With reference to FIG. 2D, when the computer system is in a virtual mode, the operating system, for example, OP SYS 1, OP SYS 2 and OP SYS 3 shown in FIG. 1B, generates virtual mode page tables as described above which are used to translate between virtual memory spaces of programs being run thereunder and a virtual mode physical address space. It will be appreciated that the virtual mode physical address space is not the physical address space of the computer system, but instead is an emulation of a physical address space produced by the virtual machine monitor. As has been noted above, the virtual mode physical address space may correspond to the computer system's physical address space, or to a subset of the computer system's physical address space, or to an address space larger than the computer system's real physical address space.

The virtual machine monitor also generates and uses a VMM Physical Address Map which includes VMM MEs virtual machine monitor map entries. The virtual machine monitor establishes a physical address map for each virtual machine it operates. The VMM map entries are generally similar to the entries in the page tables generated by the operating system. As shown in FIG. 2D, each VMM PTE includes an A/R access rights field and a PFN page frame number field. The access rights field in the map entries indicate only whether the virtual machine may read or read/write the indicated block in memory. The virtual machine monitor uses the VMM map entries in translating the addresses in the virtual mode physical address space to addresses in the real physical address space.

Thus, if the processor requires access to a location in page X of the VM virtual address space, it first retrieves the page table entry for the page from the VM page table (PTE: PG X). If the valid field V indicates that the page is in memory, and the access rights field indicates that the processor is in an operating mode in which the requested read or write operation may be performed, the processor uses the page frame number (PFN) to obtain the address in the VM "physical" address space of the block in memory, block A, which is currently assigned the data for page X of the VM virtual address space.

The processor then determines the address of the corresponding location in the real physical memory. First, it retrieves the map entry for block A in the VM physical address space from the VMM physical address map (ME: BLK A). If the access rights field indicates that the requested read or write operation may be performed, the processor uses the page frame number to obtain the address in the real physical memory of the block in memory, Block Q which actually stores the data for page X of the VM virtual address space.

The virtual machine monitor also has a virtual address space, and the processor makes use of a VMM page table to translate addresses in the VMM virtual address space to the addresses in the real physical memory. The VMM page table entries (VMM PTEs) are similar to the VM PTEs, and include a V valid field, A/R access rights field, M modify field, and PFN page frame number field, all of which are used in the same way as the corresponding fields of the VM PTEs. The result of the translation of an address in, for example, page Y of the VMM virtual address space, using the VMM page table entry corresponding thereto (VMM PTE: PG Y) is an address in Block R of the real physical memory.

As is conventional, the computer system, specifically the virtual machine monitor, after establishing a VMM physical address map, establishes a shadow page table, or a composite of a VM page table generated by the operating system running on the computer system, and the VMM physical address map. The shadow page table allows a direct translation between the virtual mode virtal address space and the real physical address space, thereby reducing the number of translations required between a program reference to memory and the actual memory access. The shadow page table includes page table entries having fields with identical meanings as the VM and VMM page tables.

In accordance with the invention, when the virtual machine monitor generates a shadow page table, it uses the same compression function described above in connection with FIG. 2C to determine the contents of the A/R access rights fields in the SPT PTEs. Specifically, for the specific embodiment noted in connection with FIG. 2C, if the contents of the A/R access rights field in the VM Page Table indicates that the block in the VM physical address space is readable or read/writable by programs in the user, supervisor or executive operating modes, and if the VMM MEs indicate that the block in real physical memory is readable or read/writable by the virtual machine, the A/R access rights field in the SPT PTEs also indicate that the corresponding blocks in the real physical address space are available to programs in the user, supervisor or executive operating modes. However, if the contents of the A/R access rights field in the VM Page Table indicate that the block is available to programs in. the kernel operating mode, since the computer system is in virtual mode, the PTE indicates that the corresponding block in the real physical address space is available to programs in the executive operating mode. Thus, the locations in memory associated with the kernel operating mode of the processor when operating in the virtual mode are available to programs operating in the executive operating mode.

It will be appreciated by those skilled in the art that the VMM address translation allows data to be shared as between several virtual machines in a controlled manner. For example, several VMM MEs relating to different virtual machines , may identify the same block in the real physical address space and thereby allow contemporaneous access to programs running under both virtual machines. The access rights to the block of programs running under the different virtual machines may, however, differ. For example, programs running under one virtual machine may be able to both read and write locations in a block, while programs running under another virtual machine may only be able to read the locations. In addition, a block may be available to programs under one operating system which operate in the supervisor and more privileged operating modes, and not available to the user operating mode, and the same block may also be available to user operating mode programs running under another operating system. Thus, the access to shared data may be regulated by the virtual machine monitor.

It will further be appreciated that similar compression functions may be used if it is desired to allow the virtual machines to have more or fewer rings than the real machines. Specifically, if the virtual machine is to have more rings than the real machine, any compression function F may be used to map the set $A=(0, 1, \ldots, N)$ of privilege levels in the virtual machine into a set $B=(0, 1, \ldots, M)$ of privilege levels in the real machine, with the successive elements of the sets corresponding to successively less privileged rings, N greater than M and M greater than "1", as long as the function satisfies the following relationships:

i. F (0) is greater than "0";

ii. F (N) is less than or equal to M; and iii. if "i" and "j" are elements of set "A" such that "i" is greater than or equal to "j", then F (i) is greater than or equal to F (j).

Since the number of protection rings in the virtual mode (specifically, the number of rings is "N+1"), is greater than the number of rings in the real mode ("M+1"), to satisfy these conditions the compression function must compress at least two of the virtual rings to correspond to a signal real ring.

Similarly, if the virtual machine is to have fewer rings than the real machine, that is, N is less than M and M greater than "1", the function must satisfy the following relationships:

i. F (0) is greater than "0";

ii. if "i" is greater than or equal to "j", then F (i) is greater than or equal to F (j);

iii. for at least one "i" and "j", "i" not equal to "j", F (i) is equal to F (j); and iv. if "i" and "j" are elements of set "A" such that "i" is greater than or equal to "j", then F (i) is greater than or equal to F (j).

Since the number of protection rings in the virtual mode (specifically, the number of rings is "N+1"), is less than the number of rings in the real mode ("M+1"), the last condition (iv) must be observed to achieve compression.

It will further be appreciated by those familiar with the VAX-11 architecture as set forth in the aforementioned VAX-11 Architecture Reference Manual that the VAX-11 virtual memory space is divided into a plurality of regions, including system space and two perprocess spaces, and that the translation arrangement described in connection with FIG. 2D relates to the translation for system space. The translation for the per-process spaces is analogous.

4. Register Sets

Figures 3, 8B:
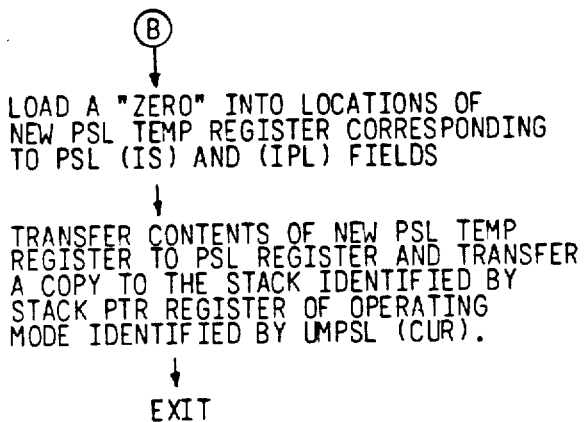

FIGS. 3A through 3C depict the registers included in processor 10 used in the processing of programs. FIG. 3A depicts the registers used by processor 10 in processing programs in either the real mode or the virtual mode. These registers include general purpose registers R0 through R13, a stack pointer register R14, a program counter R15, a user stack pointer register 50, a supervisor stack pointer register 51, and an executive stack pointer register 52. The registers R0 through R13 can be used as pointers, arithmetic accumulators, or for any other general purpose function. The stack pointer register R14 contains the stack pointer currently being used. Program counter register R15 identifies the location in memory 11 of the next instruction to be processed by the processor. The user, supervisor, and executive stack pointer registers 50 through 52 identify the locations in memory of the stacks for the respective modes, except when the processor is in the corresponding operating mode. At that time, the operating mode stack is identified by the contents of stack pointer register R14, which are obtained from the corresponding operating mode stack pointer register when the processor changes operating modes.

FIG. 3B depicts additional registers used by processor 10 in the real operating mode. These registers include a kernel stack pointer 53, an asynchronous system trap (AST) level register 54, an interrupt stack pointer register 55, an interrupt summary register 56, an interrupt request register 57, and a processor status longword register 60. The kernel stack pointer register 53 is similar in function to the user, supervisor, and executive stack pointer registers 50 through 52.

The AST level register 54 identifies the most privileged level operating mode for which an asynchronous system trap is pending. For example, if an asynchronous system trap is pending for a program operating in the real supervisor level, and if the processor 10 is operating in the kernel mode, it is undesirable to service the trap until the processor returns to at least the supervisor mode. When the processor changes modes, it can check the contents of the AST level register 54 to determine whether a trap is pending at the new or a more privileged operating mode and trap at that time.

The interrupt stack pointer register 55 is used to identify the location in memory of the interrupt stack, which is typically transferred to stack pointer register R14 when the processor 10 begins servicing an interrupt. When the processor finishes servicing an interrupt, the contents of the stack pointer register R14 are transferred to the interrupt stack pointer register 55 after the registers have been restored in a conventional manner.

The interrupt summary register 56 is used in connection with interrupt requests. Processor 10 has a plurality of interrupt priority levels, and the interrupt summary register identifies the interrupt priority levels at which interrupts are pending.

The interrupt request register 57 may be used by the executing program to request interrupt service. The data written to the register specifies the interrupt priority level of the requested interrupt. The priority level loaded into register 57 is then reflected in interrupt summary register 56.

The processor status longword 60, which will be described below in connection with FIG. 3D-1, contains status information in connection with the currently executing program.

To enable the processor 10 to operate in a virtual mode, the processor also includes a plurality of registers, termed herein virtual registers, depicted in FIG. 3C. When the processor is operating in a virtual mode, it uses the registers depicted in FIG. 3A and the registers depicted in FIG. 3C. The virtual registers include a VM (virtual machine) kernel stack pointer register 61, a VM AST level register 62, a VM interrupt stack pointer register 63, a VM interrupt summary register 64, a VM interrupt request register 65, and a VM process status longword register 66. Each of the virtual registers depicted in FIG. 3C corresponds to a register in the real register set depicted in FIG. 3B, and the processor uses the registers 61 though 66 in the same way that it uses registers 53 through 57 and 60 when in the real mode.

With reference again to stack pointer register R14, mode stack pointer registers 50 through 53, and 61 and interrupt stack pointer registers 55 and 63, the mode and interrupt stack pointer registers are used when the processor changes operating modes, as explained below in connection with FIGS. 8A-1 and 8A-2, and, in the case of the interrupt stack pointer register, when the processor begins processing an interrupt or returns therefrom. In brief, when the processor begins processing an interrupt, it typically transfers the contents of the stack pointer register R14 to the mode stack pointer register 50 through 53 or 61 corresponding to the current operating mode. The contents of the interrupt stack pointer register 55 or, if the processor is in the virtual mode, the VM interrupt stack pointer register 63, are transferred to stack pointer register R14, and the contents of selected registers are transferred to the interrupt stack in memory identified by the contents of the stack pointer register. When the processor returns from an interrupt, the sequence for which is contained in FIGS. 7A-1 through 7E, the process is essentially reversed.

The contents of processor status longword 60 and VM processor status longword 66 in the processor 10 constructed in accordance with the invention will be described in connection with FIGS. 3D-1 and 3D-2. It will be appreciated that the processor has separate processor status longwords 60 and 66 for the virtual and real modes, both of which have many of the same fields. Both processor status longwords include a plurality of fields 70 through 77 and 70A through 77A which identify various conditions concerning the results of the previous arithmetic calculations, and which enable the processor to perform various exception or trap operations in response thereto. The fields are not relevant to the instant invention and will not be described further herein.

Both the processor status longwords 60 and 66 also include IPL interrupt priority level fields 80 and 80A which identify the interrupt priority level at which the processor is operating. The processor can use the contents of this field and the contents of the real or virtual interrupt summary registers 56 and 64 to determine whether an interrupt is pending at a higher priority level than the current operating level as contained in the IPL interrupt priority level fields 80 and 80A, and, if so, process the interrupt request.

Current mode fields 81 and 81A and previous mode fields 82 and 82A identify respectively, the current operating mode and previous operating mode (see FIG. 2B), and specifically contains the code depicted in FIG. 2B which identifies either the kernel, executive, supervisor or user operating mode. These fields do not indicate whether the processor is in the virtual or real (non-virtual) mode.

A VM virtual mode field 84, contained only in the processor status lonwword 60, when set, indicates that the processor is currently operating in a virtual mode, thereby enabling the processor to use registers 61 through 66. When field 84 is clear, the processor is operating in a real (non-virtual) mode, using registers 53 through 57 and 60.

An IS interrupt stack field 83 or 83A indicates that the processor is operating on its interrupt stack; that is, the contents of the stack pointer register R14 are derived from the contents of one of the interrupt stack pointer 55 or VM interrupt stack pointer 63, depending on the state of VM field 84 in processor status longword 60. Since the contents of stack pointer register R14 may have been changed if the contents of the other registers have been transferred to the interrupt stack, the contents of the register R14 may not be exactly the same as the contents of register 55 or 63.

As will be appreciated by those skilled in the art, a virtual machine, that is, a computer system (FIG. 1A) whose processor is operating in a virtual mode, may itself be running a virtual machine monitor providing a second level of virtualization. If that occurs, a further set of registers similar to register 61 through 66 typically are provided. Any of these additional registers may be physically located in either the processor 10 or in the memory 11 (FIG. 1A). The VM processor status longword 66 does not require a VM field corresponding to field 84 in processor status longword 60 to accomplish this second level of virtualization.

It will also be appreciated that additional virtual stack pointer registers may have to be provided for various virtual operating modes if the protection rings are compressed differently than the specific embodiment disclosed herein. As is discussed above in connection with FIGS. 2C and 2D, the compression function used with a specific system may result in compression of differnnt virtual mode operating modes than the kernel and executive into a single real mode operating mode. If, for example, the virtual mode executive and supervisor operating modes are compressed into the real mode supervisor operating mode, and the virtual mode kernel operating mode corresponds to the real mode executive operating mode, the virtual machine may use the executive stack pointer register also used by the real machine, and an additional register must be provided for the virtual mode executive operating mode. Similarly, if the virtual mode kernel, executive and supervisor operating modes are all compressed, with the virtual mode user operating mode, to correspond to the real mode user operating mode, additional stack pointer registers must be provided for the virtual mode kernel, executive and supervisor operating modes.

5. Probing Operands And Instructions

As has been noted, certain instructions are privileged, that is, they are only executed by the processor 10 (FIG. 1A) when it is in the kernel operating mode (FIG. 2A). In addition, it is desirable to prevent the processor 10 from accessing data stored in memory 11 that is for programs in more privileged operating modes when the processor is operating in a less privileged operating mode.

Accordingly, prior to retrieving any operands and executing any instructions, the CPU performs a PROBE operation on the operands and the operation code of each instruction before executing the instruction.

Figure 4:
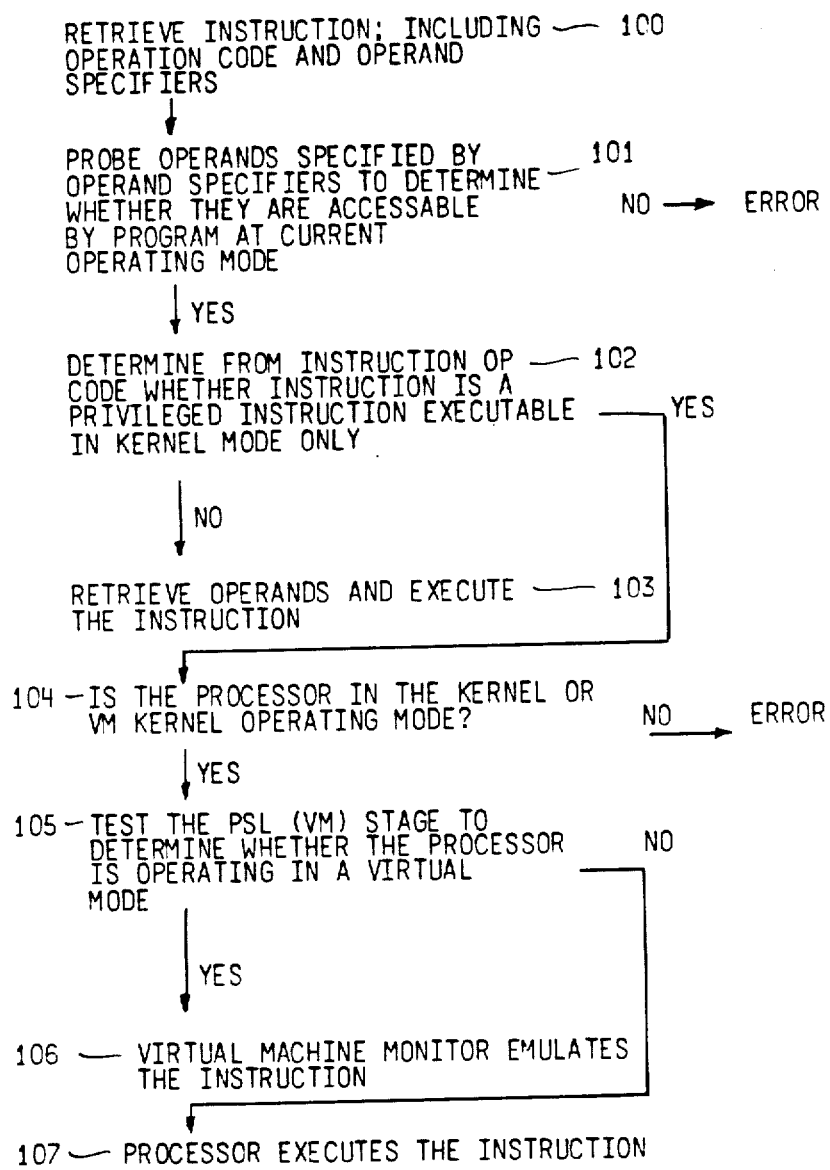
FIG. 4 is a flow diagram illustrating the steps performed by the computer system depicted in FIG. 1A in probing the operands and operation codes of an instruction to determine whether the operands can be accessed and the instructions executed by the computer system in the various operating modes.
Figure 5:
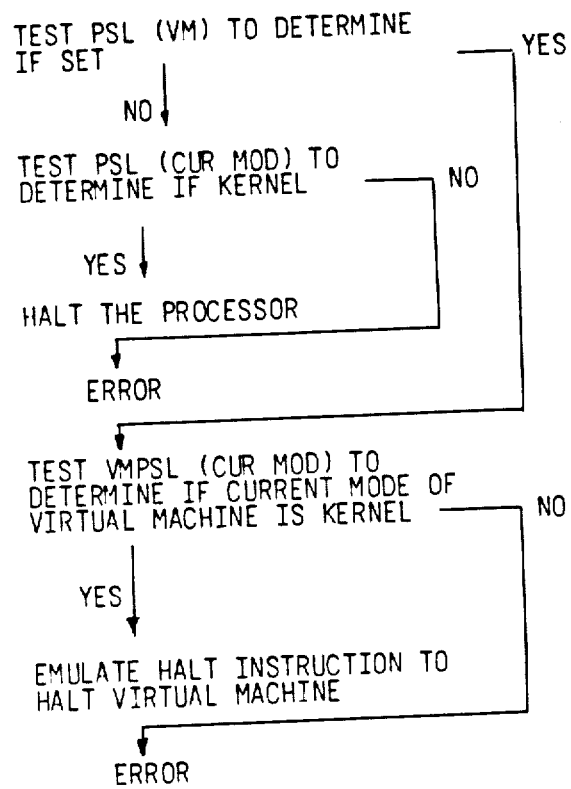

With reference to FIG. 4, when the CPU 10 retrieves an instruction, which includes the operation code (op code) and operand specifiers (step 100), it first probes the memory locations containing the operands, which are identified by the operand specifiers in the instruction, to determine whether they are accessible by the program with the processor in its current operating mode (step 101). If they are not accessible, an error has occurred.

However, if the operands are accessible to the program at the current operating mode (step 101), the processor then determines whether the operation required by the instruction is privileged, that is, whether the instruction is a privileged instruction executable in kernel mode only (step 102). If the instruction is not privileged, the processor retrieves the operands and executes the instruction (step 103).

If, however, in step 102 the processor determined that the instruction was privileged, the processor sequences to step 104 to test the current mode field 81 in the processor status longword. If the processor is operating in a virtual mode, it tests the current mode field in the VM processor status longword 66, and otherwise tests the corresponding field in the processor status longword register 60. If the processor is not in the kernel operating mode (step 104) it signals an error.

However, if, in step 104, the processor did determine that it was in the kernel operating mode, it tests the VM virtual mode field 84 of the processor status longword register 60 to determine whether the processor is operating in a virtual mode (step 105). If the processor is operating in a virtual mode, the processor may execute the instruction directly or the virtual machine monitor may emulate the instruction (step 106). If the processor is not operating in a virtual mode, the processor executes the instruction directly (step 107). Ihe steps performed by the virtual machine monitor to emulate instructions are covventional and will not be described in detail herein.

Since the processor, when it retrieves an instruction, first probes the operand prior to determine whether the instruction is privileged, it can trap to the virtual machine monitor, in the event that the instruction requires emulation, and the virtual machine monitor will not itself then have to probe the operands to determine whether they are accessible by the program. This has several benefits, including simplification of the virtual machine monitor, since it does not have to include routines for performing the operation, and reduction of the likelihood of an error having to be taken in the virtual machine monitor in the event that a page is not present in memory. If the operand probe operation detects that a page containing the operands is not in memory, the processor takes a page fault. In the instant invention, this occurs before the processor traps to the virtual machine monitor for emulation of the instruction.

6. Privileged Instruction Execution

FIGS. 5 through 9 contain flow diagrams which illustrate the operations of processor 10 in executing some of the VAX-11 privileged instructions. The instructions, and others forming the VAX-11 instruction set, are described in the aforementioned VAX-11 Architecture Reference Manual, for a processor which does not have a virtual mode. The figures detail the operations of the processor 10 which has both a real (non-virtual) and virtual mode.

As noted above, the privileged instructions may be emulated when the processor is operating in the virtual mode or they may be executed by the processor directly in response to microcode or similar control mechanisms in the processor. In one embodiment of the invention in which microcode is used to control the internal operations of the processor in executing instructions, the instructions are embodied in microcode to the extent of microcode control store in pre-existing processors constructed in accordance with the VAX-11 architecture, and instructions not so embodied are emulated by the virtual machine monitor. Alternatively, a microcoded processor may embody all of the instructions in microcode and execute them directly, or all of the instructions may be emulated by the virtual machine monitor, depending on the size of the microcode control store in the processor. In a processor controlled by combinatorial logic, the logic may also control the operation of the processor in processing the privileged instruction, or the instructions may be emulated by the virtual machine monitor. The detailed operations performed by the processor 10 in both the virtual and real modes are contained in the flow diagrams in FIGS. 5 through 9, and will not be repeated here in detail. However, brief comments on the steps used in processing of the instructions will be presented below.

HALT Instruction

The HALT instruction is used to stop the processor. When the processor receives the HALT instruction in connection with a program in a virtual machine, if the virtual machine is in the kernel mode, the instruction halts that virtual machine, and not the processor as a whole. Thereafter, the processor 10 can continue executing in a real mode or as any other virtual machines which may be running in a virtual mode.

MOVE PROCESSOR STATUS LONGWORD to (Destination)

Figure 6:
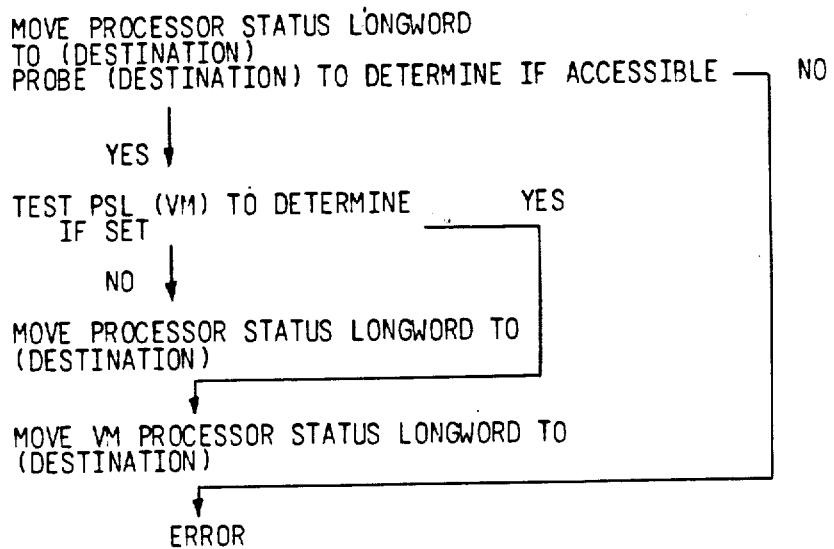

The instruction MOVE PROCESSOR STATUS LONGWORD to a selected destination, the destination being identified by the operand specifier which accompanies the instruction, is detailed in FIG. 6. In response to the instruction, the processor must determine if it is operating in a virtual mode to determine whether the contents of the processor status longword in register 60 (FIG. 3B) or the contents of the VM processor status longword 66 (FIG. 3C) should be moved.

RETURN FROM EXCEPTION OR INTERRUPT

Figures 2, 5, 7A:
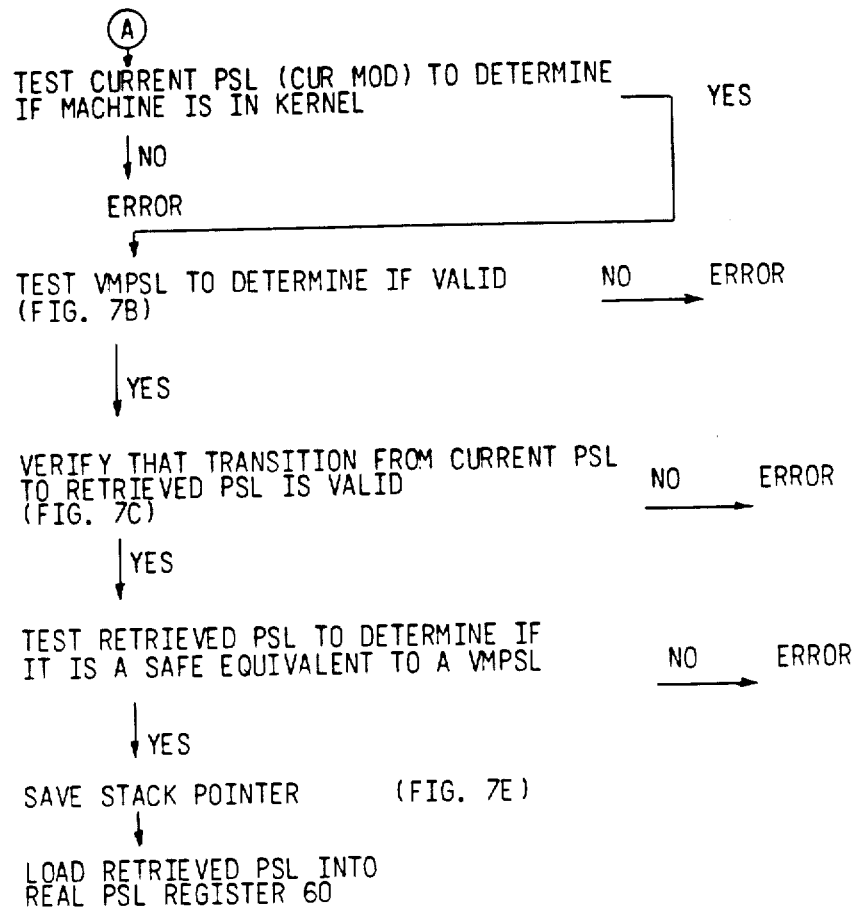
Figures 6, 7A:
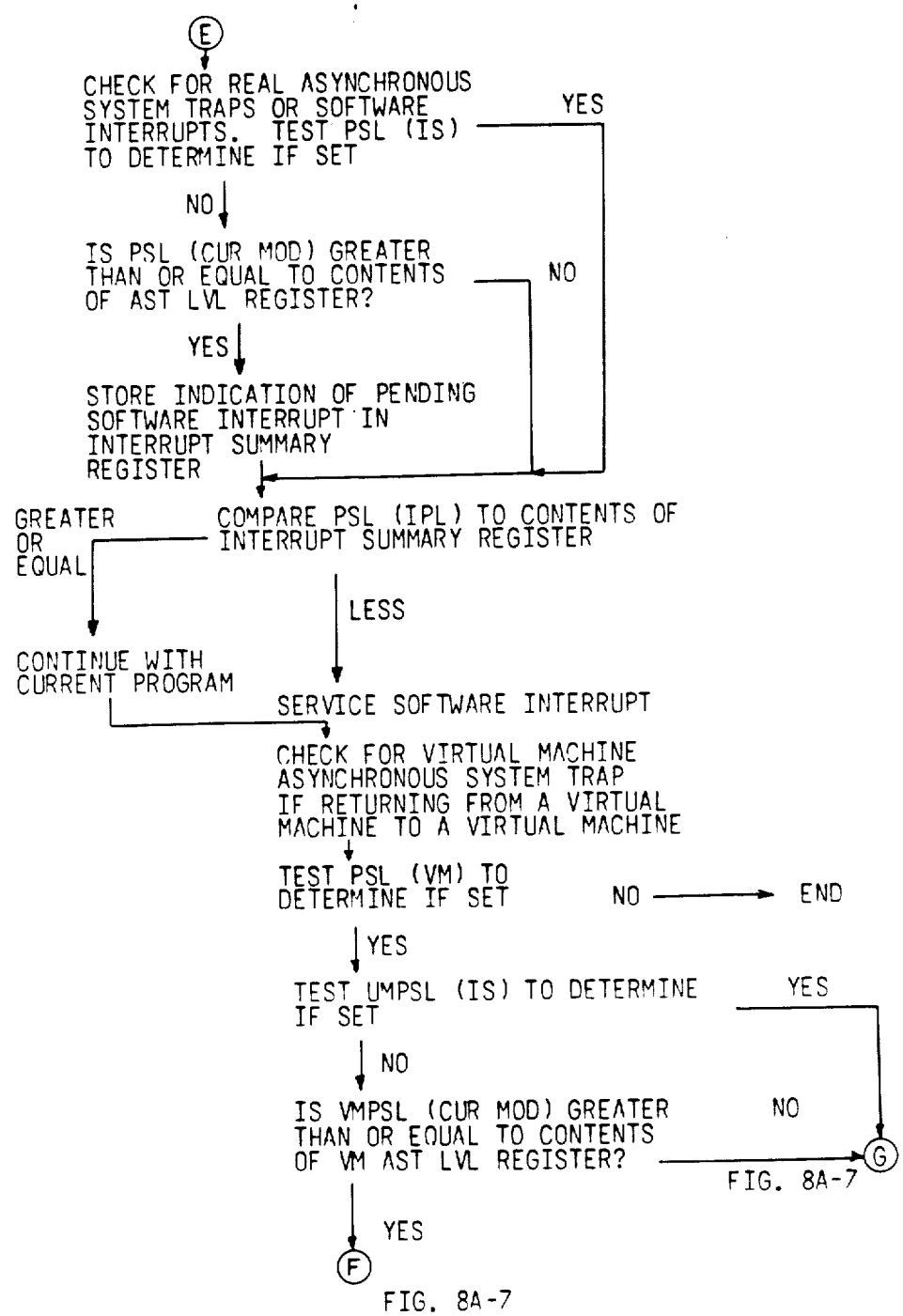

In processing the RETURN FROM EXCEPTION OR INTERRUPT instruction, depicted in FIGS. 7A-1 through 7E, the processor 10 first tests the virtual mode field 84 of the current processor status longword, that is, the contents of processor status longword 60 used when the processor is servicing the interrupt or exception, and the processor status longword retrieved from the stack in response to this instruction.

Depending on the status of the VM fields 84 in the two processor status longwords, the processor may be (1) returning from interrupt or exception or exception service in a real mode to processing in a real mode, if the VM fields of both the current and the retrieved processor status longwords are clear;

(2) returning from interrupt or exception or exception service in a real mode to processing in a virtual mode, if the VM field of the current processor status longword is clear, and the VM field of the retrieved processor status longword is set;

(3) returning from interrupt or exception or exception service in a virtual mode to processing in a virtual mode, if the VM field of the current processor status longword is set and the VM field of the retrieved processor status longword is clear; and (4) returning from interrupt or exception or exception service in a virtual mode to processing in a second level of virtualization, if the VM fields of both the current and retrieved processor status longwords are set.

If the VM field 84 of neither processor status longword is set, that is, if the processor was not operating in a virtual mode (that is, it was operating in a real mode) when it was servicing the interrupt or exception, and it is returning in a real mode, the processor returns in a conventional manner.

If the interrupt or exception was serviced by the processor in a real mode, but the processor is returning in a virtual mode (FIG. 7A-2) (case 2) the contents of the VM processor status longword 66 and the retrieved processor status longword are compared to ensure that they correspond, that is, the fields of the processor status longword retrieved from the stack are compared to corresponding fields of the VM processor status longword register to ensure that the retrieved processor status longword is a "safe equivalent" of the VM processor status longword. To form a "safe equivalent" processor status longword the arithmetic fields 70 through 76 and the trace flag 77 should be the same as the retrieved processor status longword, the interrupt or exception priority level field 80 and interrupt or exception stack field 83 should both be clear and the previous and current operating mode fields 81 and 82, should also be the same as the retrieved processor status longword, except that if either indicate the kernel operating mode, it should be modified to indicate the executive operating mode. The VM (virtual mode) field 84 of the retrieved processor status longword should also be set. After verifying the retrieved processor status longword, the processor continues returning in a conventional manner.

If the interrupt or exception was processed in a virtual mode, but the processor status longword retrieved from the stack indicates that the processor is returning in a real mode (case 3), the retrieved processor status longword is stored in the VM processor status longword register 66, and a new "safe equivalent" processor status longword is formed therefrom for storage in processor status longword register 60. The sequence of forming the new processor status longword for register 60 is set forth in FIG. 7D. After verifying the retrieved processor status longword, the processor continues returning in a conventional manner.

Finally, if the VM fields of both the current and the retrieved processor status longwords are set (case 4), the processor traps to the virtual machine monitor.

CHANGE OPERATING MODE Instruction

The change operating mode instruction depicted in FIGS. 8A-1 and 8A-2 is provided to allow the program to change operating modes as between the kernel, executive, supervisor and user from a less-privileged operating mode to a more privileged operating mode (FIG. 2B). In doing so, the processor first determines the new mode, then saves the contents of the stack pointer register R14 in the current mode stack pointer, loads into the stack pointer register R14 the contents of the new mode's stack pointer and stores the contents of selected registers and the operand of the instruction onto the stack identified by the new stack pointer. For example, if the processor is changing from the user operating mode to the supervisor operating mode, the contents of the stack pointer register R14 are transferred to the user stack pointer register 50, and are replaced by the contents of the supervisor stack pointer register 51.

If the change mode is to or from the kernel operating mode, the processor tests the contents of the VM field 84 of the processor status longword to determine which of the kernel stack pointer register 53 or the VM kernel stack pointer register 61 is used in processing the instruction.

The processor then tests the accessibility of the memory location identified by the new contents of the stack pointer register in the new operating mode. However, if the new operating mode is the kernel operating mode, and if the processor is operating in a virtual mode, the location must be accessible by the executive mode. Thus, with reference to FIG. 2A, if the processor is in a virtual mode, and the current operating mode is the kernel, locations in memory must be accessible by the processor when operating at the real executive mode. Thus the virtual executive and virtual kernel operating modes are compressed into the real executive mode as depicted in FIG. 2A.

Probe Accessibility of Memory Location

The PROBE instruction, depicted in FIG. 9, checks the read or write accessibility of one or several locations in memory specified as the operands of the instruction.

Other Instructions

The sequences of operations to execute other privileged instructions, including a LOAD PROCESS CONTEXT instruction, a SAVE PROCESS CONTEXT instruction and MOVE TO and MOVE FROM processor register instructions are also modified from the sequences depicted in the VAX-11 Architecture Reference Manual to accommodate the virtual mode. All of these instructions move the contents of certain processor registers to memory, or the contents of certain memory locations to identified registers. For the LOAD PROCESS CONTEXT and MOVE TO PROCESSOR REGISTER instructions, the modifications ensure that the retrieved data are loaded in the correct set of registers, and for the SAVE PROCESS CONTEXT and MOVE FROM PROCESSOR REGISTER instructions, the data are moved from the correct registers.

The foregoing description has been limited to a specific embodiment of this invention. It will be apparent, however, that the invention can be practiced in computer systems having diverse basic construction than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A processor for use in a computer system, (a) the processor including processing means for processing instructions in at least three protection ring operating modes each associated with one of a hierarchy of privilege levels (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group, (c) said processor further comprising:

A. means connected to said processing means and for connection to said memory means for iteratively retrieving instructions from the memory means requiring access to a location in memory;

B. operating mode indicating means for identifying the privilege level of the current protection ring operating mode of said processor;

C. virtual mode indicating means for indicating whether or not said processor is operating in a virtual mode;

D. compression means connected to said operating mode indicating means for identifying a virtual mode operating mode in response to the current protection ring operating mode identified by said operating mode indicating means, said compression means operating in accordance with a compression function "F" which maps a set $A = (0, 1, \ldots, N)$ into a second set $B = (0, 1, \ldots, N)$, each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" identifies the least privileged level, said compression function F satisfying the following conditions:
  i. $F(0) = 1$, and
  ii. If "i" is greater than "0" and less than or equal to "N", thnn $F(i) = i$;

E. selection means connected to said operating mode indicating means, said virtual mode indicating means and said compression means for selectively transmitting as an output the privilege level identified by said compression means in response to said virtual mode indicating means indicating that said processor is operating in a virtual mode, and otherwise transmitting the privilege level identified by said operating mode indicating means;

F. comparison means for comparing the output of said selection means to the privilege means of the location in memory to which the processor requires access to determine whether the processor can access the required memory location; and G. means responsive to a successful comparison by said comparison means for enabling the processing means to access the required memory location and execute the instruction.

2. A processor for use in a computer system, (a) the processor including processing means for processing instructions in at least three protection ring operating modes each associated with one of a hierarchy of privilege levels (b) said computer system including a memory means which includes a plurality of addressable storage locations for storing instruction requiring access to the memory locations, said memory means being comprised of plural groups of memory locations, wherein the number of memory locations in each memory group may vary, each memory group having an associated privilege means for identifying the protection ring operating modes in which the processor can access any memory location in the group, (c) said processor further comprising:

A. means connected to said processing means and for connection to said memory means for iteratively retrieving instructions from the memory means requiring access to a location in memory;

B. operating mode indicating means for identifying the privilege level of the current protection ring operating mode of said processor;

C. virtual mode indicating means for indicating whether or not said processor is operating in a virtual mode;

D. compression means connected to said operating mode indicating means for identifying a virtual mode operating mode in response to the current protection ring operating mode identified by said operating mode indicating means, said compression means operating in accordance with a compression function "F" which maps a set $A = (0, 1, \ldots, N)$ into a second set $B = (0, 1, \ldots, N)$, each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" identifies the least privileged level, said compression function F satisfying the following conditions:
  i. F (0) is greater than "0", and
  ii. if "i" and "j" are elements of set "A" such that "i" is greater than or equal to "j", then F (i) is greater than or equal to F (j);

E. selection means connected to said operating mode indicating means, said virtual mode indicating means and said compression means for selectively transmitting as an output the privilege level identified by said compression means in response to said virtual mode indicating means indicating that said processor is operating in a virtual mode, and otherwise transmitting the privilege level identified by said operating mode indicating means;

F. comparison means for comparing the output of said selection means to the privilege means to determine whether the processor can access the required memory location; and G. means responsive to a successful comparison by said comparison means for enabling the processing means to access the required memory location and execute the instruction.

3. A processor for use in a computer system, (a) the processor including processing means for processing instructions in "N" protection ring operating modes each associated with one of a hierarchy of privilege levels, where "N" is at least three, said processor operating in a virtual mode and in a real mode, (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group and an associated virtual mode privilege means for identifying the virtual mode protection ring operating modes in which the processor can access any memory location when in the virtual mode, (c) said processor further comprising compression means for establishing a privilege level for storage in said virtual mode privilege means in response to the current protection ring operating mode identified by said operating mode indicating means, said compression means operating in accordance with a compression function "F" which maps a set $A = (0, 1, \ldots, N)$ into a second set $B = (0, 1, \ldots, N)$, each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" identifies the least privileged level, said compression function F satisfying the following conditions:
  i. F (0) = 0, and
  ii. If "i" is greater than "0" and less than or equal to "N", then F (i) = i.

4. A processor for use in a computer system, (a) the processor including processing means for processing instructions in "N" protection ring operating modes each associated with one of a hierarchy of privilege levels, where "N" is at least three, said processor operating in a virtual mode and in a real mode, (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group and an associated virtual mode privilege means for identifying the virtual mode protection ring operating modes in which the processor can access any memory location when in the virtual mode, (c) said processor further comprising compression means for establishing a privilege level for storage in said virtual mode privilege means in response to the current protection ring operating mode identified by said operating mode indicating means, said compression means operating in accordance with a compression function "F" which maps a set $A = (0, 1, \ldots, N)$ into a second set $B = (0, 1, \ldots, N)$, each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" identifies the least privileged level, said compression function F satisfying the following conditions:
  i. F (0) is greater than "0", and
  ii. if "i" and "j" are elements of set "A" such that "i" is greater than or equal to "j", then F (i) is greater than or equal to F (j).

5. A processor for use in a computer system, (a) the processor including processing means for processing instructions in "N" protection ring operating modes each associated with one of a hierarchy of privilege levels, where "N" is at least three, (b) said computer system including a memory means which includes a plurality of addressable storage locations for storing instruction requiring access to the memory locations, said memory means being comprised of plural groups of memory locations, wherein the number of memory locations in each memory group may vary, each memory group having an associated privilege means for identifying the protection ring operating modes in which the processor can access any memory location in the group, (c) said processor further comprising:
  a. inhibiting means connected to said processing means for inhibiting said processing means from executing at least some of the instructions unless the processor is in an operating mode having a selected privilege level;
  b. operating mode indicating means for identifying the privilege level of the current operating mode of said processor;
  c. instruction retrieval means for connection to the memory for iteratively retrieving instructions from the memory;
  d. operand probe means including:
    i. operand privilege retrieval means connected to said instruction retrieving means and responsive to the retrieval of an instruction for obtaining the privilege means associated with a memory location identified by an operand specifier;
    ii. operand privilege comparison means connected to said operating mode indicating means and said operand privilege retrieval means for determining if the privilege level of the current operating mode is at least as high as the privilege level obtained by said operand privilege retrieval means; and
  e. instruction probe means connected to said operand probe means, said operating mode indicating means, said instruction retrieval means, and said inhibiting means and responsive to a successful determination by said operand privilege comparison means for enabling said inhibiting means to inhibit execution of a retrieved instruction by said processing means if said operating mode indicating means does not identify a mode having the required privilege level for the instruction.

6. A processor for use in a computer system, (a) the processor including processing means for processing instructions in at least three protection ring operating modes each associated with one of a hierarchy of privilege levels (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group, (c) said processor further comprising:
  A. means connected to said processing means and for connection to said memory means for iteratively retrieving instructions from the memory means requiring access to a location in memory;
  B. operating mode indicating means for identifying the privilege level of the current protection ring operating mode of said processor;
  C. virtual mode indicating means for indicating whether or not said processor is operating in a virtual mode;
  D. compression means connected to said operating mode indicating means for identifying a virtual mode operating mode in response to the current protection ring operating mode identified by said operating mode indicating means, said compression means operating in accordance with a compression function "F" which maps a set $A = (0, 1, \ldots, N)$ into a second set $B = (0, 1, \ldots, M)$, "N" greater than "M", with each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" and "M" identify the least privileged level, said compression function F satisfying the following conditions:
    i. F (0) is greater than "0";
    ii. F (N) is less than or equal to M; and
    iii. if "i" and "j" are elements of set "A" such that "i" is greater than or equal to "j", then F (i) is greater than or equal to F (j);
  E. selection means connected to said operating mode indicating means, said virtual mode indicating means and said compression means for selectively transmitting as an output the privilege level identified by said compression means in response to said virtual mode indicating means indicating that said processor is operating in a virtual mode, and otherwise transmitting the privilege level identified by said operating mode indicating means;
  F. comparison means for comparing the output of said selection means to the privilege means of the location in memory to which the processor requires access to determine whether the processor can access the required memory location; and
  G. means responsive to a successful comparison by said comparison means for enabling the processing means to access the required memory location and execute the instruction.

7. A processor for use in a computer system, (a) the processor including processing means for processing instructions in at least three protection ring operating modes each associated with one of a hierarchy of privilege levels, said processor operating in a virtual mode and in a real mode, (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group and an associated virtual mode privilege means for identifying the virtual mode protection ring operating modes in which the processor can access any memory location when in the virtual mode, (c) said processor further comprising compression means for establishing a privilege level for storage in said virtual mode privilege means in response to the current protection ring operating mode identified by said operating mode indicating means, said compression means operating in accordance with a compression function "F" which maps a set A=(0, 1, ..., N) into a second set B=(0, 1, ..., M), "N" greater than "M", with each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" and "M" identify the least privileged level, said compression function F satisfying the following conditions:
  i. F (0) is greater than "0";
  ii. F (N) is less than or equal to M; and
  iii. if "i" and "j" are elements of set "A" such that "i" is greater than or equal to "j", then F (i) is greater than or equal to F (j).

8. A processor for use in a computer system, (a) the processor including processing means for processing instructions in at least three protection ring operating modes each associated with one of a hierarchy of privilege levels (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group, (c) said processor further comprising:
  A. means connected to said processing means and for connection to said memory means for iteratively retrieving instructions from the memory means requiring access to a location in memory;
  B. operating mode indicating means for identifying the privilege level of the current protection ring operating mode of said processor;
  C. virtual mode indicating means for indicating whether or not said processor is operating in a virtual mode;
  D. compression means connected to said operating mode indicating means for identifying a virtual mode operating mode in response to the current protection ring operating mode identified by said operating mode indicating means, said compression means operating in accordance with a compression function "F" which maps a set A=(0, 1, ..., N) into a second set B=(0, 1, ..., M), "M" greater than "N", with each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" and "M" identify the least privileged level, said compression function F satisfying the following conditions:
    i. F (0) is greater than "0";
    ii. if "i" is greater than or equal to "j", then F (i) is greater than or equal to F (j);
    iii. for at least one "i" and "j", "i" not equal to "j", F (i) is equal to F (j); and
    iv. if "i" and "j" are elements of set "A" such that "i" is greater than or equal to "j", then F (i) is greater than or equal to F (j).
  E. selection means connected to said operating mode indicating means, said virtual mode indicating means and said compression means for selectively transmitting as an output the privilege level identified by said compression means in response to said virtual mode indicating means indicating that said processor is operating in a virtual mode, and otherwise transmitting the privilege level identified by said operating mode indicating means;
  F. comparison means for comparing the output of said selection means to the privilege means of the location in memory to which the processor requires access to determine whether the processor can access the required memory location; and
  G. means responsive to a successful comparison by said comparison means for enabling the processing means to access the required memory location and execute the instruction.

9. A processor for use in a computer system, (a) the processor including processing means for processing instructions in at least three protection ring operating modes each associated with one of a hierarchy of privilege levels, said processor operating in a virtual mode and in a real mode, (b) said computer system including a memory means which includes a plurality of addressable storage locations for storing instructions requiring access to the memory locations, said memory means being comprised of plural groups of memory locations, wherein the number of memory locations in each memory group may vary, each memory group having an associated privilege means for identifying the protection ring operating modes in which the processor can access any memory location in the group and an associated virtual mode privilege means for identifying the virtual mode protection ring operating modes in which the processor can access any memory location when in the virtual mode, (c) said processor further comprising compression means for establishing a privilege level for storage in said virtual mode privilege means in response to the current protection ring operating mode identified by said operating mode indicating means, said compression means operating in accordance with a compression function "F" which maps a set A=(0, 1, ..., N) into a second set B=(0, 1, ..., M), "M" greater than "N", with each element of the set A identifying one of the privilege levels when the processor is operating in the virtual mode and each element of the set B identifying one of the privilege levels when the processor is not operating in the virtual mode, the successive elements of each set corresponding to protection rings of progressively lower privilege, such that in each set "0" identifies the most privileged level and "N" and "M" identify the least privileged level, said compression function F satisfying the following conditions:
  i. F (0) is greater than "0";
  ii. if "i" is greater than or equal to "j", then F (i) is greater than or equal to F (j);
  iii. for at least one "i" and "j", "i" not equal to "j", F (i) is equal to F (j); and
  iv. if "i" and "j" are elements of set "A" such that "i" is greater than or equal to "j", then F (i) is greater than or equal to F (j).

10. A processor for use in a computer system, said processor including processing means for processing instructions in at least three protection ring operating modes each associated with one of a hierarchy of privilege levels, the computer system further including a memory including a plurality of addressable storage locations for storing instructions requiring access to memory locations and including operation code means identifying the operation to be performed, each memory location having an associated privilege means for identifying the protection ring operating modes in which the processor can access the memory location, said processor further including:
 a. means for iteratively retrieving instructions from the memory;
 b. operating mode indicating means for identifying the privilege level of the current operating mode of said processor;
 c. virtual mode indicating means having a set condition when said processor is operating in a virtual mode and otherwise having a clear condition; and
 d. probe means connected to said processing means, said instruction retrieval means, said operating mode indicating means, said virtual mode indicating means and for connection to the memory for comparing the contents of the operating mode indicating means to a less privileged operating mode level if the indicating means has a set condition and the operating mode indicating means identifies the most privileged operating mode, and for comparing the contents of the operating mode indicating means to at least the least privileged operating mode level if the indicating means has a set condition and the operating mode indicating means identifies a less privileged operating mode to determine whether the processor can access the required memory locations for enabling said processing means to execute the instruction in response to a successful comparison.

11. A processor for use in a computer system, said processor including processing means for processing instructions in at least three protection ring operating modes each associated with one of a hierarchy of privilege level, each memory location having an associated privilege means for identifying the protection ring operating modes in which the processor can access the memory location, said processor further including virtual machine monitor means for establishing the protection ring operating mode in said privilege means including means for determining the privilege level to be assigned to the contents of each said memory location and means for enabling the privilege means to identify the second most privileged operating mode level if the contents of the memory location is to have assigned thereto the most privileged operating mode, and otherwise establishing the privilege means to identify the operating mode level to be assigned thereto.

12. A processor as defined in claim 5 further including virtual machine monitor means for determining the privilege level to be assigned to the contents of each memory location and means for enabling the privilege means to identify a lower privileged operating mode level if the contents of the memory location is to have assigned thereto the most privileged operation mode, and otherwise establishing the privilege means to identify the operating mode level to be assigned thereto.

13. A processor as defined in any of claims 3, 4, 7, 9 or further comprising means connected to said compression means and for connection to said virtual mode privilege means for storing the privilege level generated by the compression means in the virtual mode privilege means.

14. A processor as defined in claim 13 wherein said processor includes virtual mode indicating means for indicating whether or not said processor is operating in a virtual mode, said processing means further comprising:
 A. internal register means including:
   i. real register means;
   ii. virtual register means;
 B. arithmetic and logic means connected to said real register means and said virtual register means for selectively performing operations on the contents thereof; and
 C. control means connected to said real register means, said virtual register means, said arithmetic and logic means, and said virtual mode indicating means for enabling the arithmetic and logic means to perform operations on the contents of selected ones of said real register means or said virtual register means in response to the condition of said virtual mode indicating means.

15. A processor as defined in claim 14 wherein said internal register means further includes general purpose register means, said control means enabling said arithmetic and logic means to perform operations on the contents of selected ones of the general purpose register means regardless of the condition of the virtual mode indicating means.

16. A processor as defined in claim 14 wherein said internal register means further includes status register means comprising:
 A. processor status register means and
 B. virtual status register means; said control means selectively using the contents of processor status register means or virtual status register means in response to the condition of said virtual mode indicating means.

17. A processor as defined in any of claim 1, 2, 6, 8 or 10 wherein said processing means includes:
 A. internal register means including:
   i. real register means;
   ii. virtual register means;
 B. arithmetic and logic means connected to said real register means and said virtual register means for selectively performing operations on the contents thereof; and
 C. control means connected to said real register means, said virtual register means, said arithmetic and logic means, and said virtual mode indicating means for enabling the arithmetic and logic means to perform operations on the contents of selected ones of said real register means or said virtual register means in response to the condition of said virtual mode indicating means.

18. A processor as defined in claim 17 wherein said internal register means further includes general purpose register means, said control means enabling said arithmetic and logic means to perform operations on the contents of selected ones of the general purpose register means regardless of the condition of the virtual mode indicating means.

19. A processor as defined in claim 17 wherein said internal register means further includes status register means comprising:
 A. processor status register means and
 B. virtual status register means; said control means selectively using the contents of processor status register means or virtual status register means in response to the condition of said virtual mode indicating means.

* * * * *

UNITED STATES PATENT AND TRADEMARK OFFICE
CERTIFICATE OF CORRECTION

PATENT NO. : -4,787,031
DATED : November 22, 1988
INVENTOR(S) : Karger et al.

It is certified that error appears in the above-identified patent and that said Letters Patent is hereby corrected as shown below:

Column 2, line 4, "availiable" should be --available--.

Column 5, line 19, "emulat" should be --emulate--.

Column 8, line 50, "faciities" should be --facilitate--.

Column 10, line 47, "15" should be --156--.

Column 10, line 60, "vi.rtual" should be --virtual--.

Column 11, line 40, "excutive" should be --executive--.

Column 13, line 34, "virtal" should be --virtual--.

Column 13, line 58, "in." should be --in--.

Column 16, line 14, "though" should be --through--.

Column 17, line 4, "lonwword" should be longword--.

Column 17, line 39, "differnnt" should be --different--.

UNITED STATES PATENT AND TRADEMARK OFFICE
CERTIFICATE OF CORRECTION

PATENT NO. : 4,787,031
DATED : November 22, 1988
INVENTOR(S) : Karger et al.

It is certified that error appears in the above-identified patent and that said Letters Patent is hereby corrected as shown below:

Column 18, line 31, "covventional" should be --conventional--.

Column 22, line 42, "thnn" should be --then--.

Column 29, line 62, claim 12, "operation" should be --operating--.

Column 29, line 66, claim 13, add "11" before "further".

Figure 4, "accessable" should be --accessible--.

Figure 7A-7, "conting" should be --counting--.

Figure 7B:
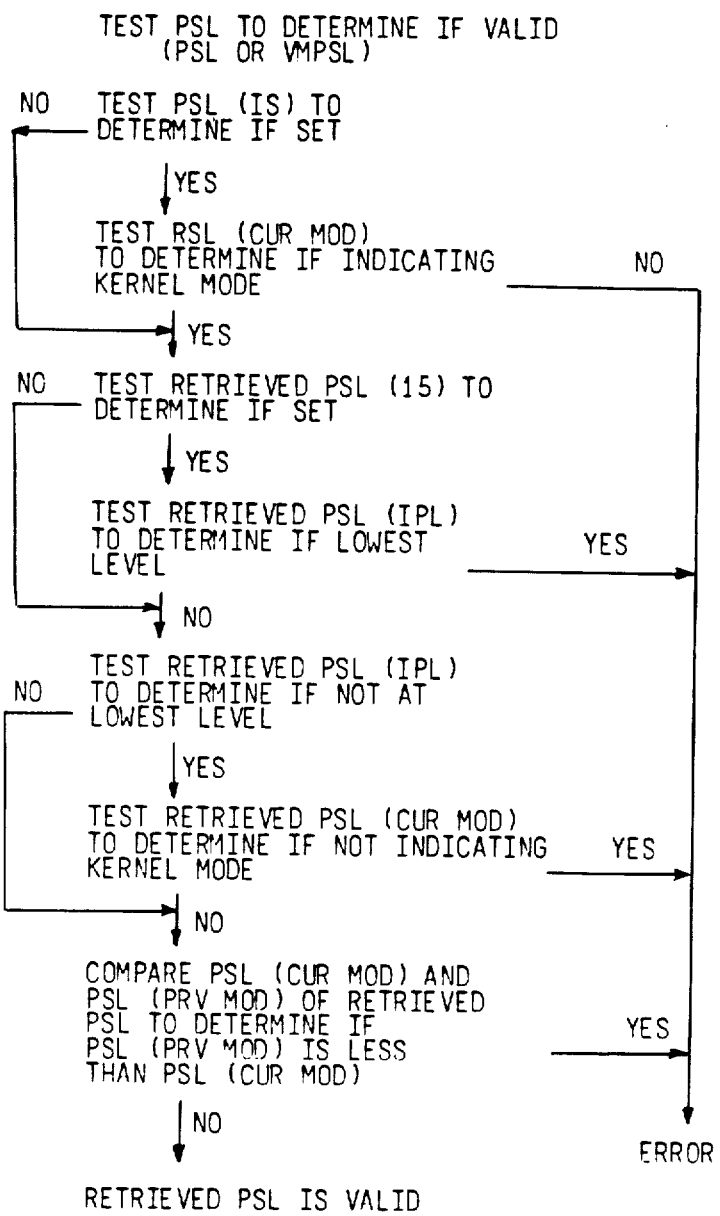
Figure 7C:
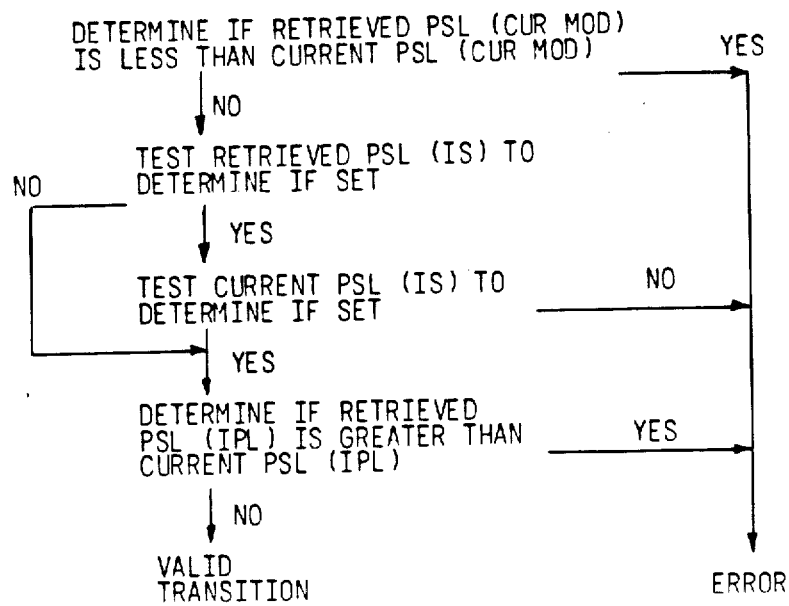

Figure 7B, line 6, "RSL" should be --PSL--.

Figure 8A-1, line 19, "VY" should be --BY--.

Figure 8A-2, line 7, "skack" should be --stack--.

Signed and Sealed this

Second Day of January, 1990

Attest:

JEFFREY M. SAMUELS

Attesting Officer

Acting Commissioner of Patents and Trademarks